United States Patent
Kamon et al.

(10) Patent No.: US 7,246,085 B2
(45) Date of Patent: Jul. 17, 2007

(54) ELECTRONIC CATALOGUE SYSTEM, SERVER, AND MEDIUM FOR DISPLAYING ON ONE SCREEN IMAGES OF A COMMERCIAL PRODUCT AND ARTICLES FOR COMPARISON

(75) Inventors: Koichi Kamon, Sakai (JP); Takashi Kondo, Sakai (JP); Shigeaki Tochimoto, Takatsuki (JP); Osamu Toyama, Kakogawa (JP)

(73) Assignee: Minolta Co., Ltd., Osaka (JP)

( * ) Notice: Subject to any disclaimer, the term of this patent is extended or adjusted under 35 U.S.C. 154(b) by 768 days.

(21) Appl. No.: 10/066,796

(22) Filed: Feb. 6, 2002

(65) Prior Publication Data

US 2002/0116298 A1    Aug. 22, 2002

(30) Foreign Application Priority Data

Feb. 9, 2001    (JP)    ............................. 2001-033177

(51) Int. Cl.
G06Q 30/00    (2006.01)
G06F 7/00    (2006.01)
G06F 9/00    (2006.01)
G09G 5/00    (2006.01)

(52) U.S. Cl. .......................... 705/26; 705/27; 715/964; 345/660

(58) Field of Classification Search ................. 705/26, 705/27; 715/964; 345/660
See application file for complete search history.

(56) References Cited

U.S. PATENT DOCUMENTS 6,002,855 A * 12/1999 Ladner et al. ................. 703/1
6,083,267 A *  7/2000 Motomiya et al. ............. 703/6
6,144,388 A * 11/2000 Bornstein ................... 345/629
6,331,858 B2 * 12/2001 Fisher ........................ 345/582
6,414,693 B1 *  7/2002 Berger et al. ............... 345/641

(Continued)

FOREIGN PATENT DOCUMENTS

JP    9-218769    8/1997

(Continued)

OTHER PUBLICATIONS

Business Editors, "Synthonics Licenses Advanced 3-D Modeling Technology to Electronic Commerce Web Site Developer," Business Wire, New York, Feb. 17, 1998, p. 1.*

(Continued)

Primary Examiner—Yogesh C. Garg
Assistant Examiner—Amee A. Shah
(74) Attorney, Agent, or Firm—McDermott Will & Emery LLP

(57) ABSTRACT

An electronic catalogue system which, for easy sensory recognition of the size of a commercial product which is displayed in an electronic catalogue, displays on one screen the image of the commercial product together with the image of an article for comparison which is for comparing and notifying the size comprises: a communication control part which reads three-dimensional data DTA regarding the commercial product and three-dimensional data DTB regarding the article for comparison; an observation image generating part which generates the image of the commercial product and the image of the article for comparison based on thus read three-dimensional data DTA regarding the commercial product and three-dimensional data DTB regarding the article for comparison; and a displaying part which displays the generated images.

21 Claims, 21 Drawing Sheets

U.S. PATENT DOCUMENTS

| | | | |
|---|---|---|---|
| 6,727,925 B1 * | 4/2004 | Bourdelais | 715/852 |
| 2001/0026272 A1 * | 10/2001 | Feld et al. | 345/419 |
| 2001/0055039 A1 * | 12/2001 | Matsuda | 345/848 |
| 2002/0010655 A1 * | 1/2002 | Kjallstrom | 705/27 |
| 2002/0030689 A1 * | 3/2002 | Eichel et al. | 345/588 |
| 2002/0055891 A1 * | 5/2002 | Yang | 705/27 |
| 2002/0093538 A1 * | 7/2002 | Carlin | 345/778 |
| 2003/0050864 A1 * | 3/2003 | Trajkovic et al. | 705/27 |

FOREIGN PATENT DOCUMENTS

| | | | |
|---|---|---|---|
| JP | 09218769 A * | 8/1997 | |
| JP | 2000200188 A * | 7/2000 | |
| JP | 2000339355 A * | 12/2000 | |

OTHER PUBLICATIONS

Webster, Fiona, "Changing Rooms? Turn To The Net For Everything Form Builders To Curtains. And You Can Even Check Out Your Plans For Feng Shui . . . " Daily Mail, London, UK, Nov. 21, 2000, p. 57.*

* cited by examiner

ELECTRONIC CATALOGUE SYSTEM, SERVER, AND MEDIUM FOR DISPLAYING ON ONE SCREEN IMAGES OF A COMMERCIAL PRODUCT AND ARTICLES FOR COMPARISON

This application is based on application No. JP2001-33177 filed in Japan, the contents of which is hereby incorporated by reference.

BACKGROUND OF THE INVENTION

1. Field of the Invention

The present invention relates to an improved electronic catalogue system, and a server, a computer program and a recording medium used in this electronic catalogue system.

The present invention more particularly relates to an electronic catalogue system with which it is possible to look at commercial products from various angles, and a server, a computer program and a recording medium used in this electronic catalogue system.

2. Description of the Related Art

As high-performance personal computers have become widely used in households and telecommunications technologies such as the Internet have advanced, systems such as Internet shopping which allow people to enjoy shopping through computers which are connected to the Internet have developed and put into actual use.

Allowing users to do shopping without going out, such a system is convenient to the users. On the contrary, since the users cannot pickup actual products with hand, it is difficult for the users to learn about the sizes of the products, etc. While the sizes of the products may be displayed on a screen as numerical figures, the users merely looking at such figures can not easily have a sensory grasp on the sizes of the products.

Noting this, methods requiring to improve the visual image of a commercial product to display on a computer screen have been proposed. For instance, among the proposed methods is a method which require to display on a screen side by side the image of a product viewed from one direction and the image of an article for comparison (JP1997-218769A). With this method, if a commercial product is a product which has been widely known from before, most users can develop sensory perception of the size of the product based on information the users have learned so far.

However, if a commercial product is a product which a user sees for the first time, the image of the product viewed from one direction alone does not permit the user to easily develop a good feeling on the size of the product. Further, even though the product has existed from before, if the product was largely modified in terms of size or to adopt an innovative design, it is possible that the user will fail to grasp the size of the product and accordingly have false recognition. The problems above are increasingly likely, as the market these days demand new products, products having small sizes or products having innovative designs.

OBJECTS AND SUMMARY

The present invention has been made in light of the background as described above. Accordingly, an object of the present invention is to provide an improved electronic catalogue system, and a server, a computer program and a recording medium used in this electronic catalogue system.

More particularly, the present invention relates to an improved electronic catalogue system with which it is possible to look at commercial products from various angles, and a server, a computer program and a recording medium used in this electronic catalogue system.

More precisely, the present invention aims at providing an electronic catalogue system which allows a user to easily develop sensory perception of the size of a product, and a server, a computer program and a recording medium used in this electronic catalogue system.

To achieve the object above and other objects, an electronic catalogue system according to one aspect of the present invention is an electronic catalogue system for displaying on one screen the image of a commercial product and the image of an article for comparison which is for comparing the size with the commercial product and notifying the size, comprising reader which reads three-dimensional data of the commercial product and three-dimensional data of the article for comparison, observation image generator which generates an observation image in which the commercial product and the article for comparison are located at predetermined positions based on thus read three-dimensional data of the commercial product and three-dimensional data of the article for comparison, and displaying device which displays the generated observation image.

Preferably, designator which designates a rotation axis and an angle of rotation and rotating device which rotates the observation image based on the designated rotation axis and the designated angle of rotation are provided.

Alternatively, designator which designates a rotation axis and an angle of rotation for each one of the commercial product and the article for comparison and rotating device which rotates the image the commercial product or the image of the article for comparison based on the designated rotation axis and the designated angle of rotation are provided.

Another aspect of the present invention requires providing a device which automatically selects the article for comparison in accordance with the type and the size of the commercial product.

Further, article for comparison storing device which stores three-dimensional data of a plurality of articles for comparison and selector which selects the three-dimensional data of one article for comparison from the article for comparison storing device are disposed, and the reader reads the three-dimensional data of the selected article for comparison.

Further, product storing device which associates product information regarding features of the commercial product with the three-dimensional data of the commercial product and stores the product information is disposed, and the displaying device displays the observation image together with the product information which corresponds to the image of the commercial product which is included in the observation image.

A server according to a certain aspect of the present invention is a server used in an electronic catalogue system for displaying on one screen the image of a commercial product and the image of an article for comparison which is for comparing the size with the commercial product and notifying the size, and the server comprises three-dimensional data storing device which stores three-dimensional data of the commercial product and three-dimensional data of the article for comparison, image generator which generates the image of the commercial product and the image of the article for comparison based on the three-dimensional data of the commercial product and the three-dimensional data of the article for comparison stored in the three-dimensional data storing device, and sender which sends the generated image of the commercial product and the generated image of the article for comparison.

A computer program according to a certain aspect of the present invention is a computer program for a terminal apparatus used in an electronic catalogue system for displaying on one screen the image of a commercial product and the image of an article for comparison which is for comparing the size with the commercial product and notifying the size, and the computer program cases the terminal apparatus to execute processing of reading three-dimensional data of the commercial product and three-dimensional data of the article for comparison, processing of generating an observation image in which the commercial product and the article for comparison are located at predetermined positions based on thus read three-dimensional data of the commercial product and three-dimensional data of the article for comparison, and processing of displaying the generated observation image.

A computer program according to a different aspect of the present invention is a computer program for a terminal apparatus used in an electronic catalogue system for displaying the image of a commercial product on a screen, and the computer program cases the terminal apparatus to execute processing of reading data which are for generating the image of the commercial product and data which are for generating the image of an article for comparison which is for comparing the size with the commercial product and notifying the size, processing of generating an observation image in which the commercial product and the article for comparison are located at predetermined positions based on respective thus read data, and processing of changing a positional relationship between the commercial product and the article for comparison and updating the observation image.

Further, the terminal apparatus is made execute processing of automatically selecting the article for comparison in accordance with the type and the size of the commercial product.

A computer program according to still other aspect of the present invention is a computer program for a terminal apparatus used in an electronic catalogue system for displaying the image of a commercial product on a screen, and the computer program cases the terminal apparatus to execute processing of reading data which are for generating the image of a first commercial product and the image of a second commercial product, and processing of generating an observation image in which the commercial products and the article for comparison are located at predetermined positions based on respective thus read data.

A recording medium according to a certain aspect of the present invention is a recording medium which can be read on a computer and which holds any one of the computer programs above.

BRIEF DESCRIPTION OF THE DRAWINGS

These and other objects and features of the present invention will become apparent from the following description of preferred embodiments thereof taken in conjunction with the accompanying drawings, in which:

FIG. 22 is a drawing showing an example of an observation window which shows a ruler and the like.

In the following description, like parts are designated by like reference numbers throughout the several drawings.

DETAILED DESCRIPTION OF THE PREFERRED EMBODIMENTS

First Preferred Embodiment

[Structure of System]

Figure 1:
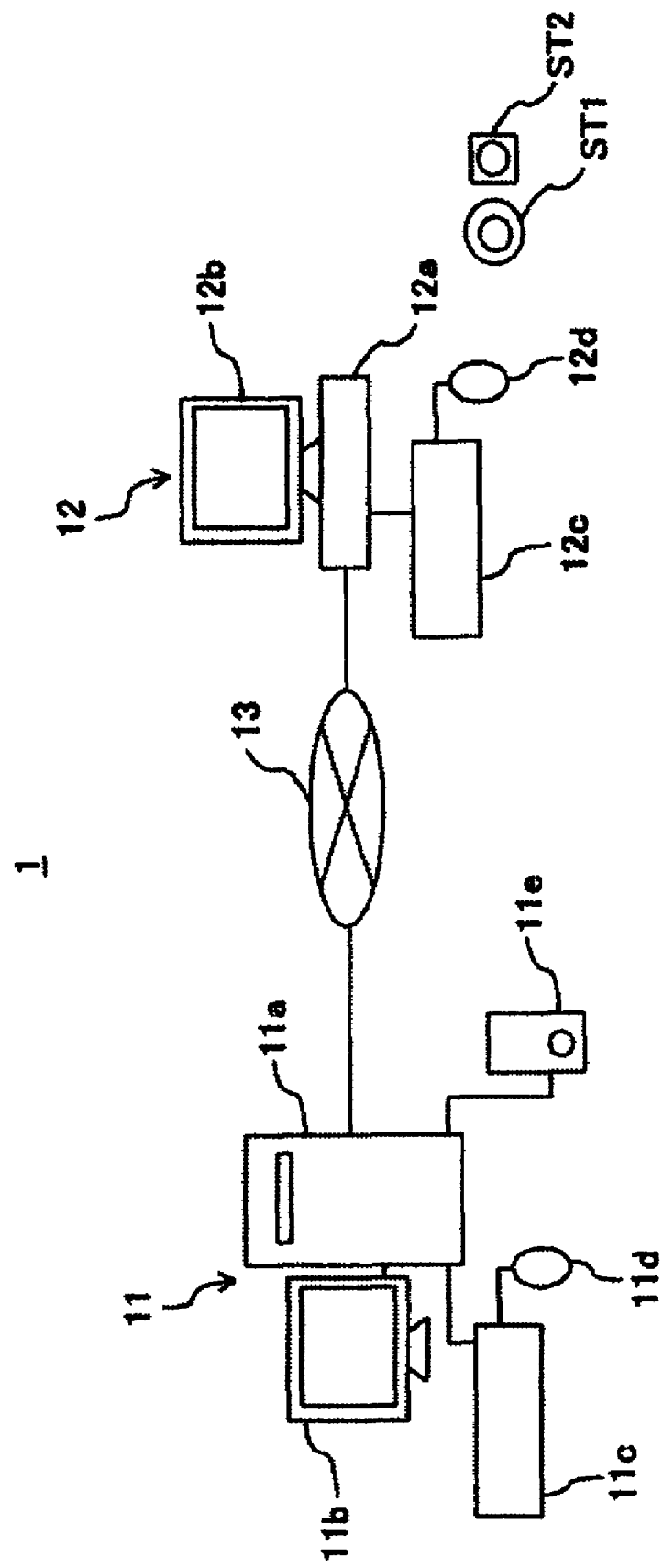
FIG. 1 is a drawing of the structure of an electronic catalogue system according to the present invention.
Figure 2:
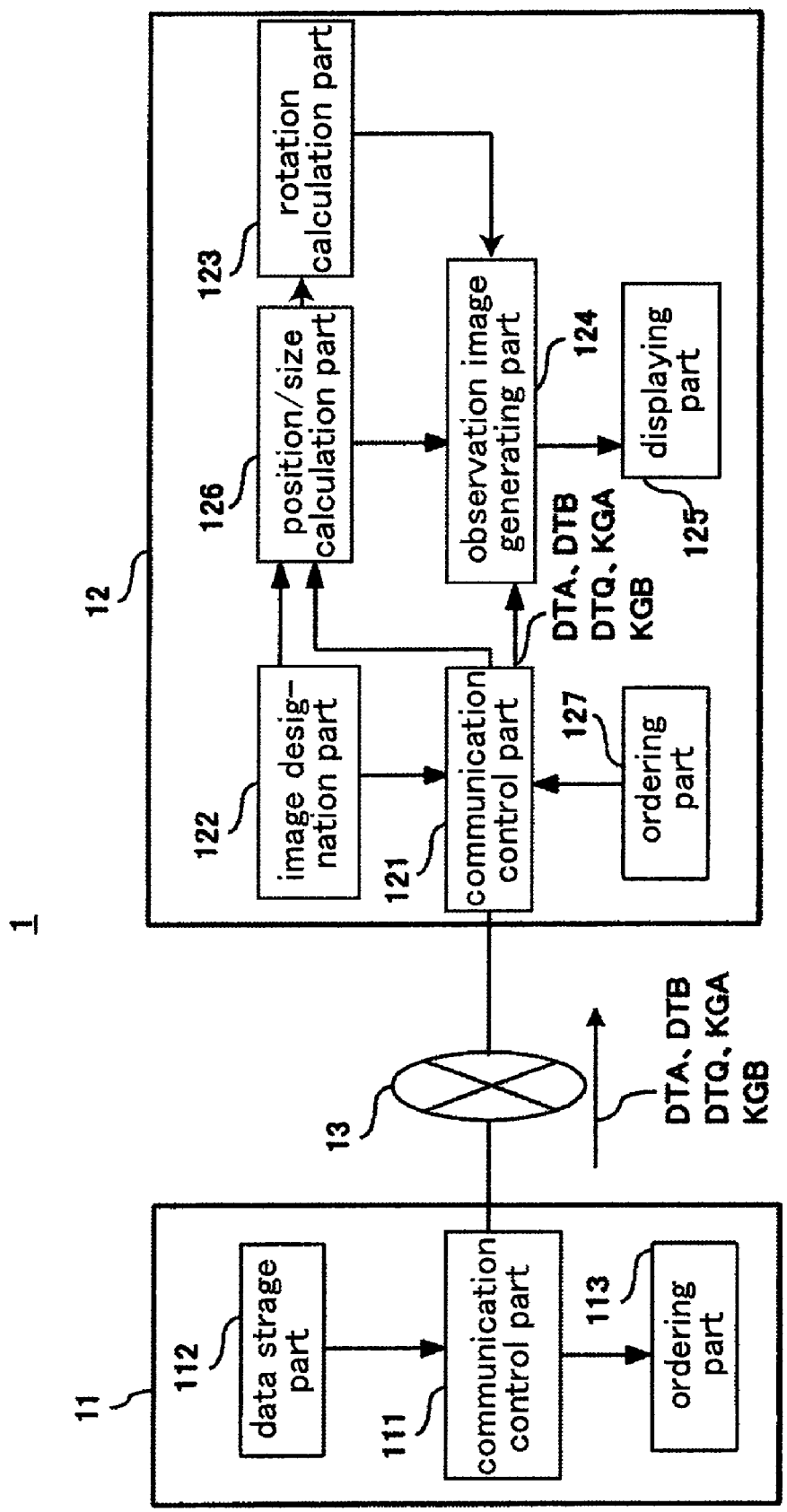
FIG. 2 is a drawing of the functional structure of an electronic catalogue system in a first preferred embodiment.

FIG. 1 is a drawing of the structure of an electronic catalogue system 1 according to the present invention, and FIG. 2 is a drawing of the functional structure of the electronic catalogue system 1 in a first preferred embodiment.

As shown in FIG. 1, the electronic catalogue system 1 is formed by a server 11, a terminal apparatus 12, and a communication line 13 which connects the server 11 and the terminal apparatus 12.

The server 11 is formed by a server main unit 11a, a display apparatus 11b, a key board 11c, a mouse 11d and the like. The server main unit 11a is formed by a CPU, a RAM, a ROM, a magnetic storage apparatus, a communication control apparatus. A three-dimensional input apparatus 11e is connected to the server main unit 11a.

Programs such as an operating system and various applications are installed in the magnetic storage apparatus.

These programs are read to the RAM in accordance with necessity and executed by the CPU. Other necessary data are also stored.

The terminal apparatus 12 is formed by a terminal apparatus main unit 12a, a display apparatus 12b, a key board 12c, a mouse 12d and the like, which is approximately similar to the server 11.

Programs such as an operating system and various applications are installed in a magnetic storage apparatus of the terminal apparatus main unit 12a. Of those, a processing program for image processing which will be described later is downloaded from the server 11 and stored in the magnetic storage apparatus. This processing program is written in a language such as VRML (Virtual Reality Modeling Language) and JAVA.

Figure 3:
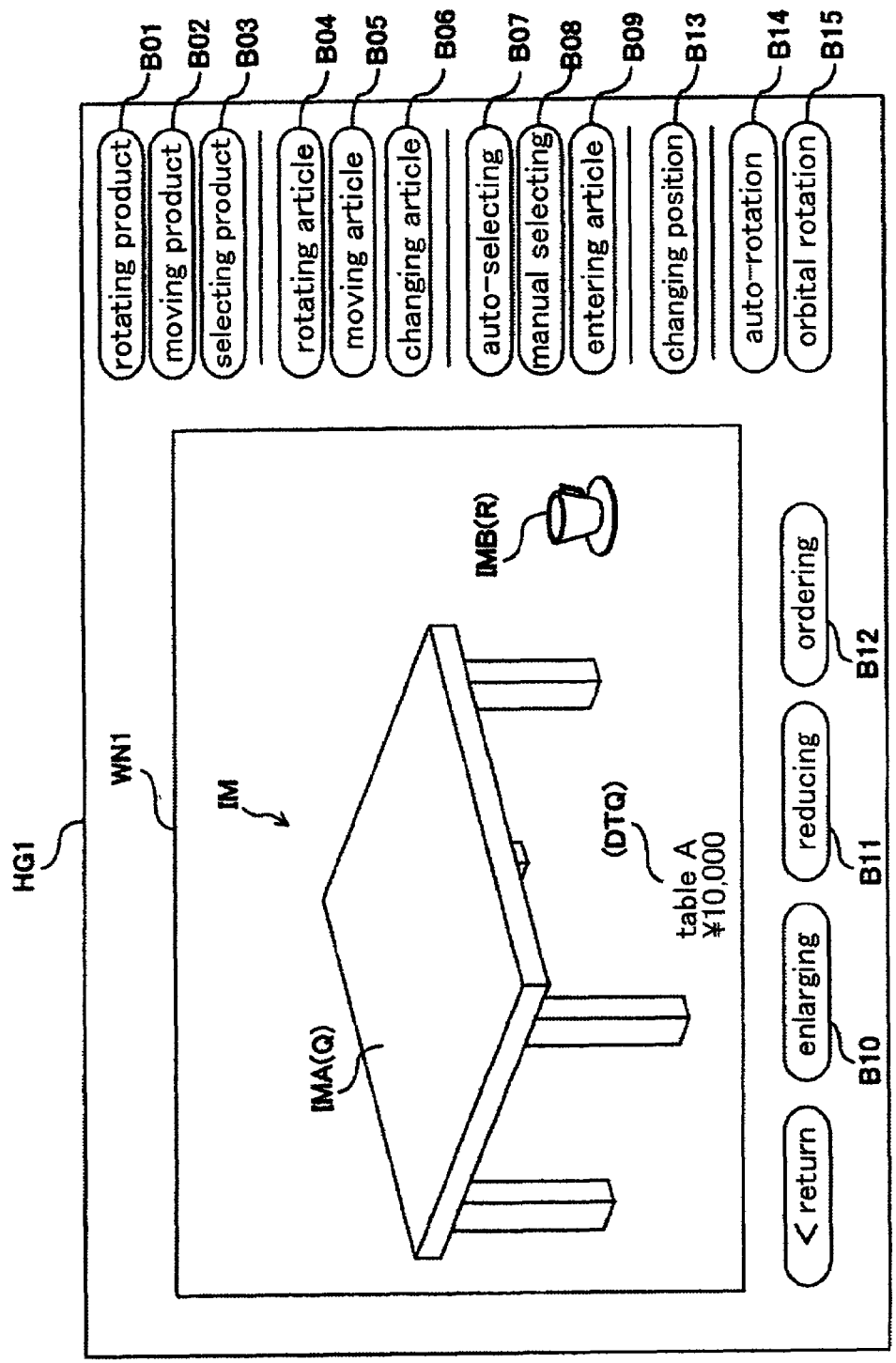
FIG. 3 is a drawing showing an example of the image of a commercial product.

The display apparatus 12b, as shown in FIG. 3, displays an observation image IM which contains a product image IMA, which is the image of a commercial product Q, and a comparison article image IMB which is the image of an article for comparison R. Visually comparing the product image IMA with the comparison article image IMB, a user can grasp the size of the commercial product Q with his or her sense. In short, the comparison article image IMB is an index image which serves as an index for developing sensory recognition of the commercial product Q.

The product image IMA and the comparison article image IMB are generated based on three-dimensional data DTA and DTB, respectively. Hence, it is possible to generate the product image IMA or the comparison article image IMB which shows the commercial product Q or the article for comparison R as viewed from a desired direction.

The three-dimensional data DTA and DTB are acquired through three-dimensional measurement of the commercial product Q and the article for comparison R, respectively, by means of the three-dimensional input apparatus 11e or the like. Alternatively, the three-dimensional data maybe generated from computer graphics using appropriate application software or by synthesizing computer graphics with data obtained by three-dimensional measurement.

As the communication line 13, a public network, a dedicated line, LAN, WAN or the Internet may be used.

Having such a structure, the electronic catalogue system 1 realizes a functional structure as that shown in FIG. 2.

As shown in FIG. 2, the server 11 includes a communication control part 111, a data storage part 112, an ordering part 113. The terminal apparatus 12 includes a communication control part 121, an image designation part 122, a rotation calculation part 123, an observation image generating part 124, a displaying part 125, a position/size calculation part 126, an ordering part 127.

The communication control parts 111 and 121 control transfer of a program or data between the server 11 and the terminal apparatus 12. For instance, the three-dimensional data DTA, DTB, respective data which will be described later or a processing program for image processing are transferred.

The data storage part 112 stores the three-dimensional data DTA, product information DTQ and simple image data KGA regarding each commercial product Q, and the three-dimensional data DTB and simple image data KGB regarding each article for comparison R. Further, these data are extracted and sent to the terminal apparatus 12, in response to a request from the terminal apparatus 12.

The product information DTQ is information regarding features of the commercial products Q, such as the product names and prices. The simple image data KGA are image data for displaying simple images which are simple to an extent that users can see approximate shapes of the commercial products Q during designation of the commercial products Q. The simple image data KGB similarly are image data representing the articles for comparison R used for designation of the articles for comparison R. As such simple images, two-dimensional small images (thumbnail images) may be used for example.

A method of displaying the functions of the respective portions, the commercial products Q and the articles for comparison R will now be described with reference to views which are displayed on the display apparatus 12b of the terminal apparatus 12.

Figure 4:
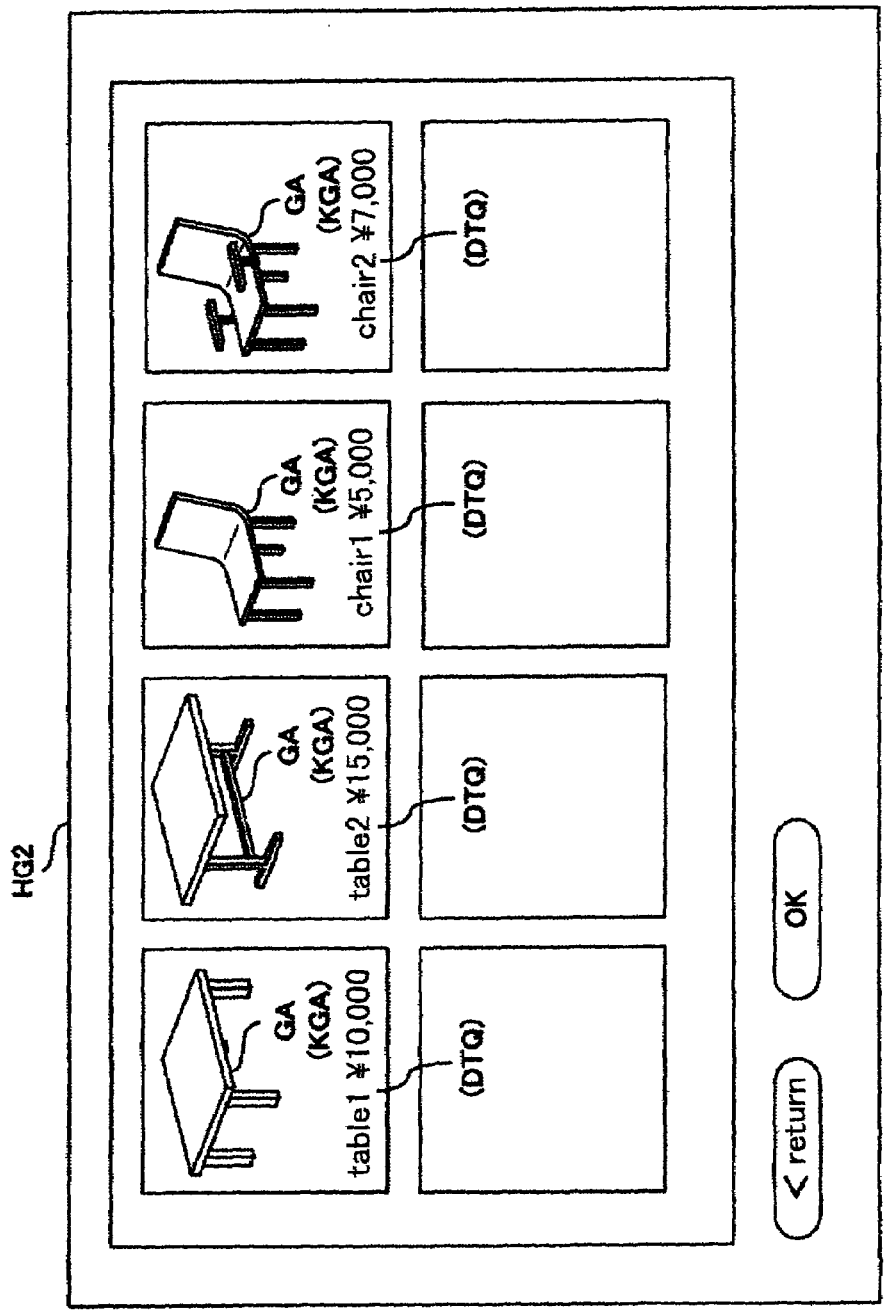
FIG. 4 is a drawing showing an example of a catalogue view.
Figure 5:
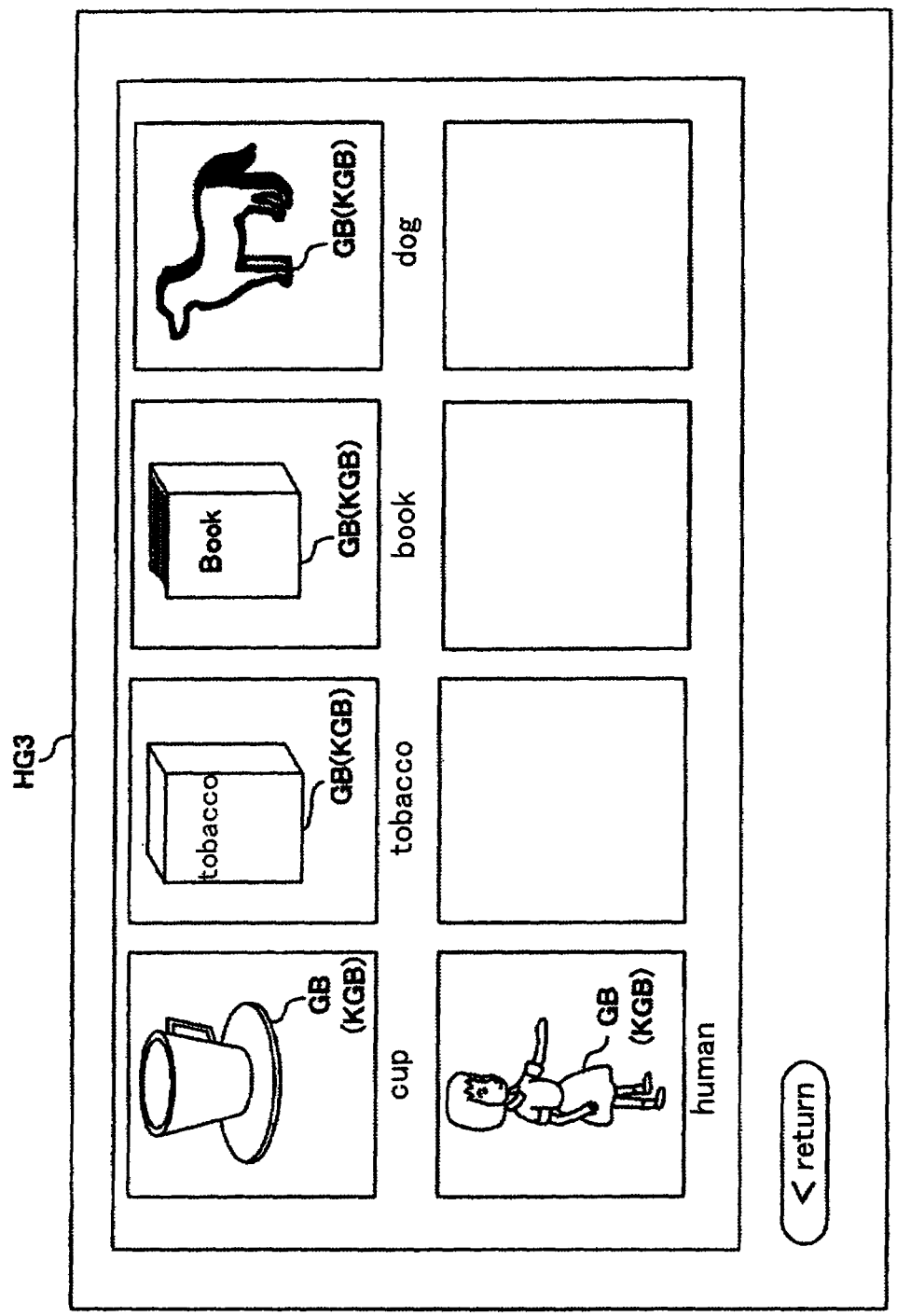
FIG. 5 is a drawing showing an example of a comparison article list view.
Figure 6:
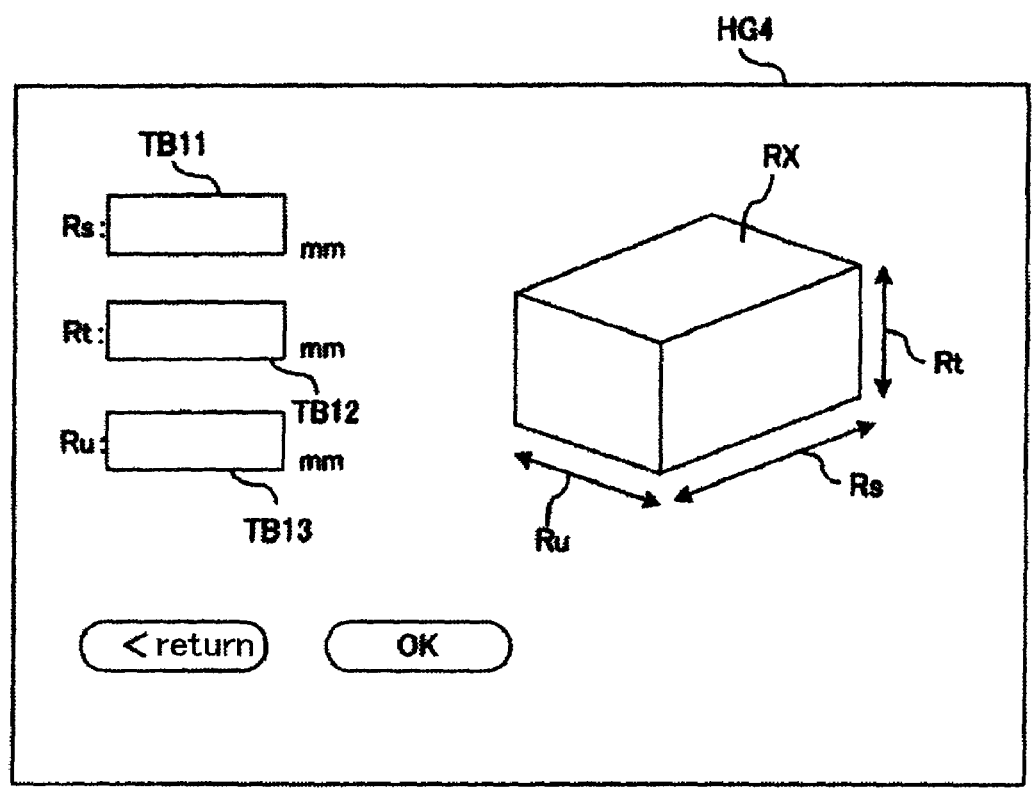
FIG. 6 is a drawing showing a size designation view.
Figure 7:
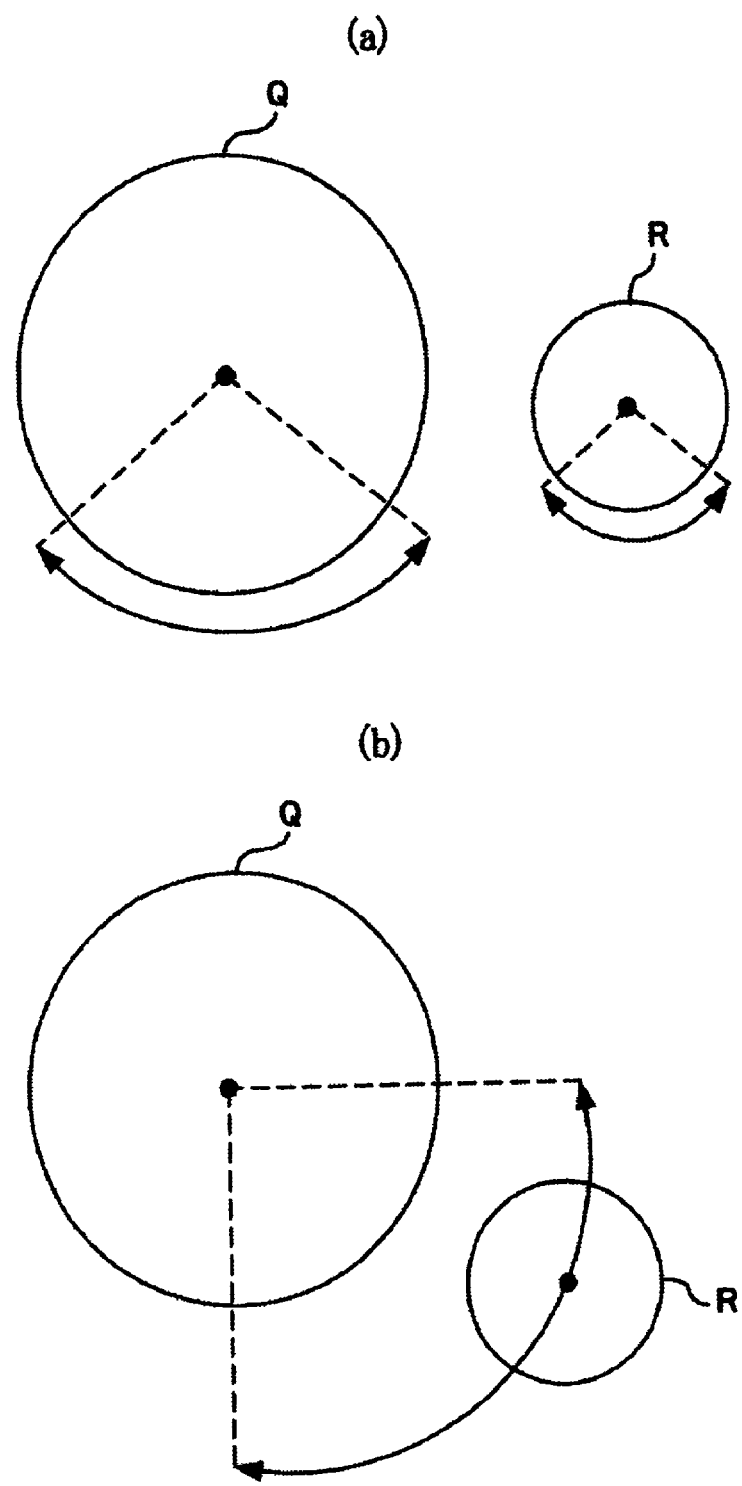
FIG. 7 is a drawing for describing auto-rotation and orbital rotation of an article for comparison.
Figure 8:
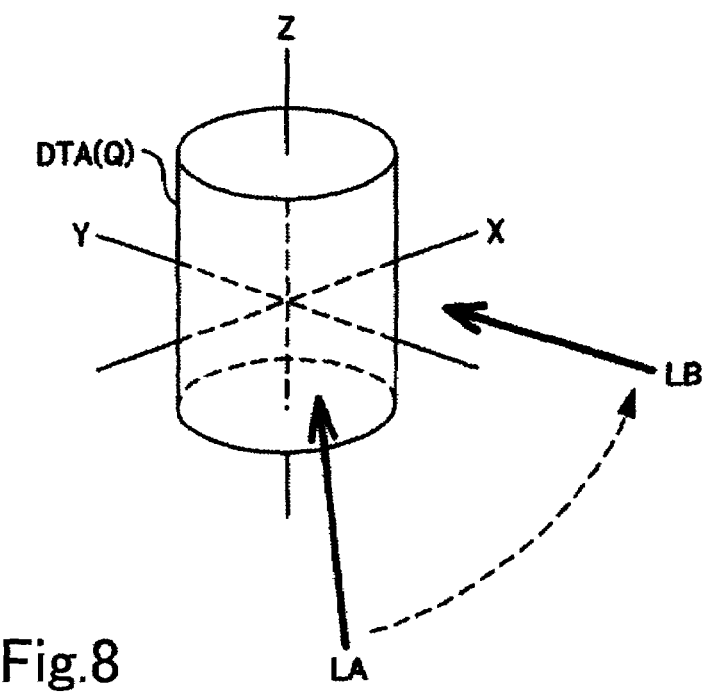
FIG. 8 is a drawing for describing the principle of processing of rotating an image.
Figure 9:
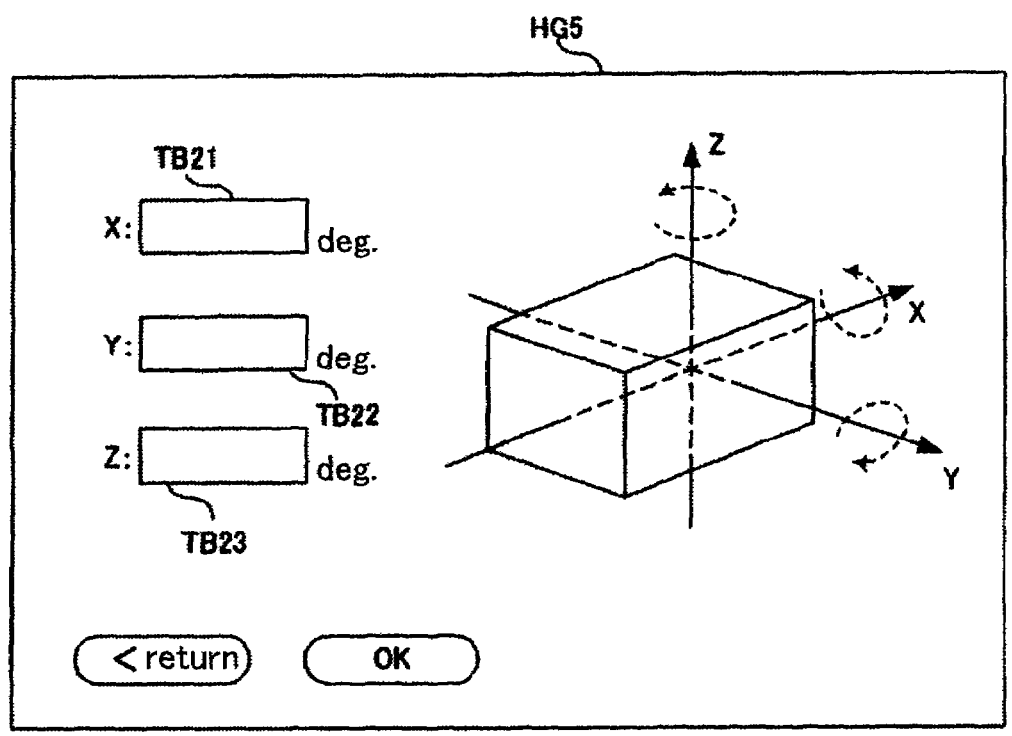
FIG. 9 is a drawing showing an example of an angle designation view.
Figure 10:
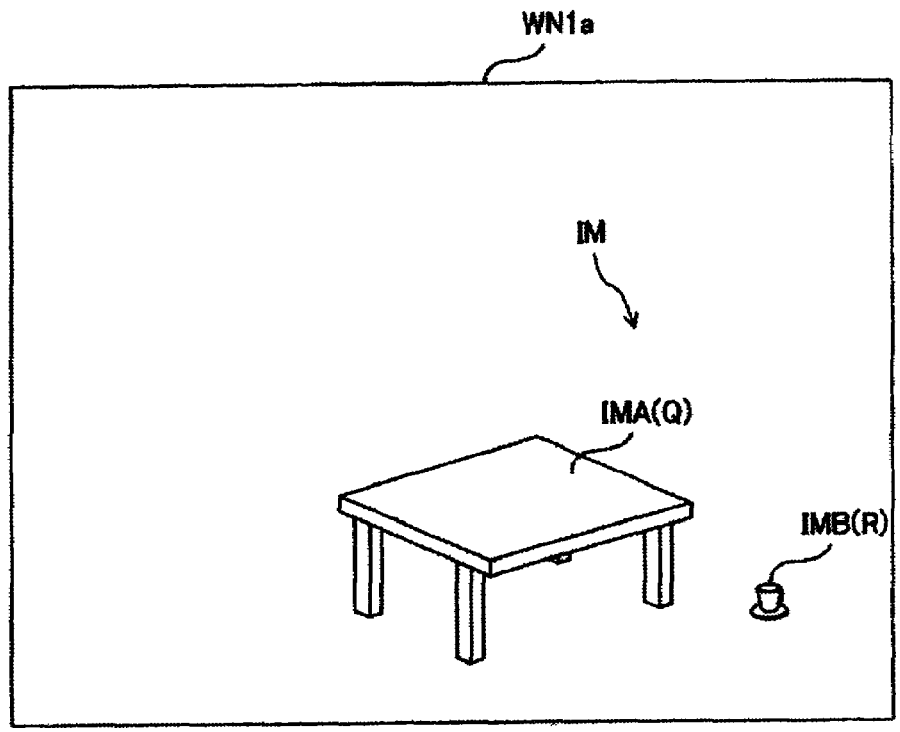
FIG. 10 is a drawing for describing an example of a change in displaying magnification.
Figure 10:
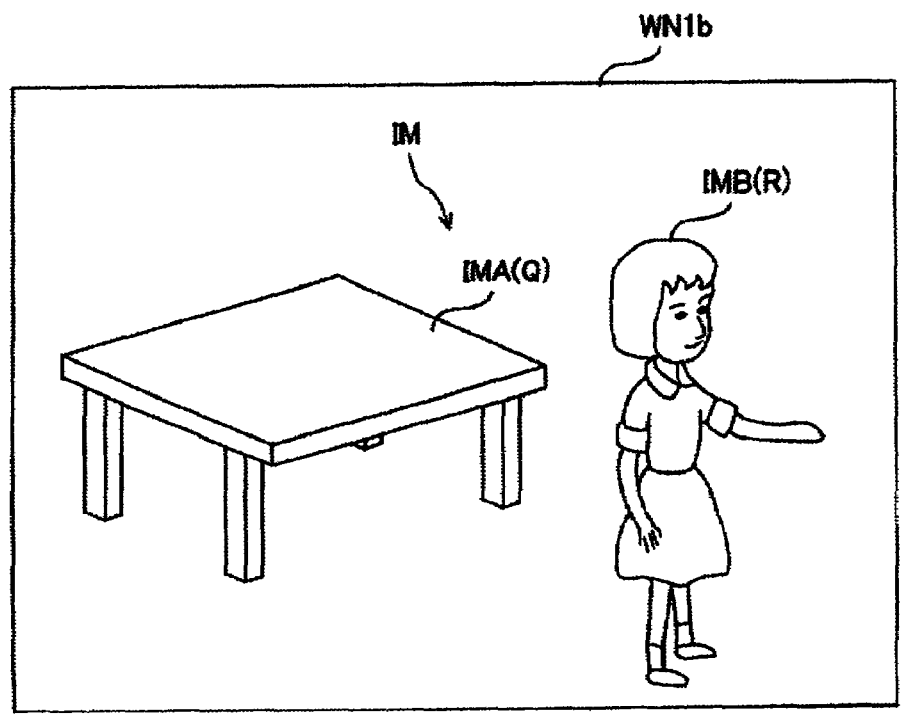
Figure 11:
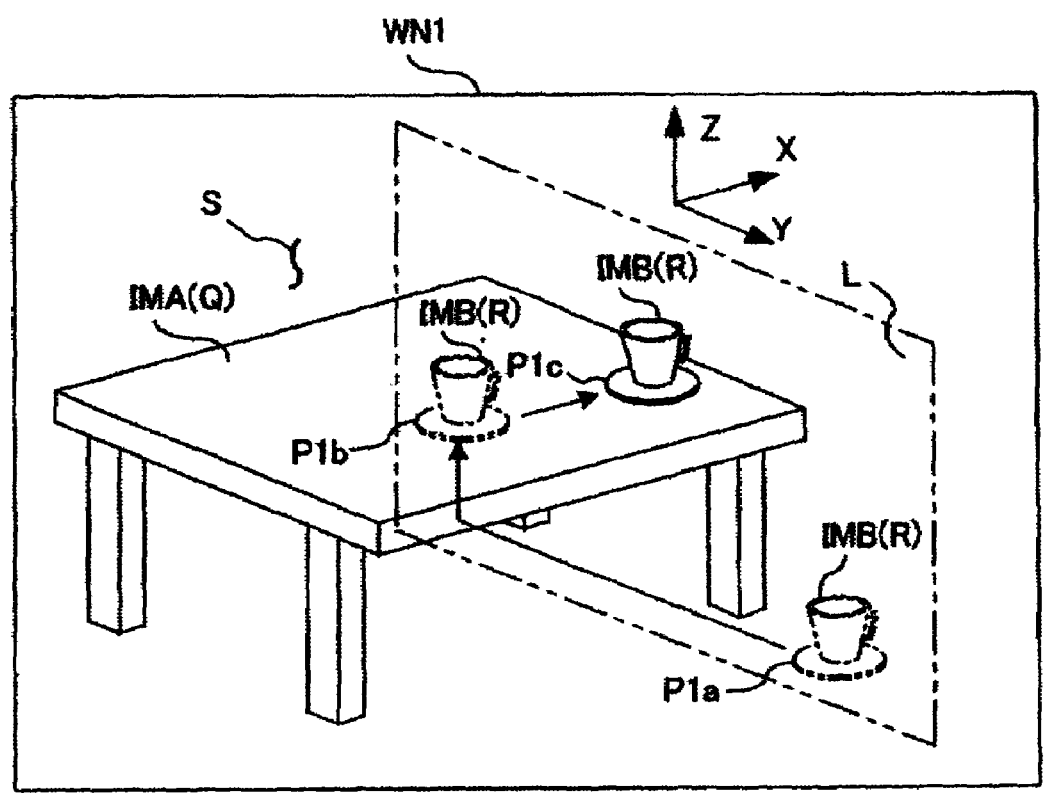
FIG. 11 is a drawing for describing a change inposition of article for comparison.

FIG. 3 is a drawing showing an example of a commercial product view HG1, FIG. 4 is a drawing showing an example of a catalogue view HG2, FIG. 5 is a drawing showing an example of a comparison article list view HG3, FIG. 6 is a drawing showing a size designation view HG4, FIG. 7 is a drawing for describing auto-rotation and orbital rotation of the article for comparison R, FIG. 8 is a drawing for describing the principle of processing of rotating an image, FIG. 9 is a drawing showing an example of an angle designation view HG5, FIG. 10 is a drawing for describing an example of a change in displaying magnification, and FIG. 11 is a drawing for describing a change in position of the article for comparison R.

[Commercial Product View]

As the commercial product Q is selected in response to an instruction from a user with the catalogue view HG2 displayed, for example, the commercial product view HG1 as that shown in FIG. 3 is displayed.

The catalogue view HG2 is displayed, as the terminal apparatus 12 accesses the server 11 and catalogue information comprising the product information DTQ and the simple image data KGA is downloaded (FIG. 4). Such a function of the terminal apparatus 12 is provided through WWW browser used on the Internet, for instance.

In FIG. 3, the commercial product view HG1 is formed by an observation window WN1, buttons B01 to B13 and the like. The purposes of major buttons and the functions of the buttons when clicked will now be described.

The button B01 is for rotating the product image IMA within the observation window WN1. The button B02 is for moving the product image IMA within the observation window WN1. The button B03 is for selecting the commercial product Q which is to be displayed as the product image IMA. This allows to select a plurality of commercial products Q and display the commercial products Q side by side. The button B04 is for rotating the comparison article image IMB within the observation window WN1. The button B05 is for moving the comparison article image IMB within the observation window WN1. The button BO6 is for changing the comparison article image IMB.

The button B07 is for automatically selecting the comparison article image IMB and displaying the comparison article image IMB adjacent to the product image IMA which is already displayed. The button B08 is for a user to select the comparison article image IMB. The button B09 is for a user to enter the comparison article image IMB. The button B10 is for enlarging images within the observation window WN1 at a predetermined magnification or any desired magnification. The button B11 is for reducing images within the observation window WN1 at a predetermined magnification or any desired magnification. The other buttons will be described later when necessary.

The content of the observation window WN1 and whether to display the buttons B01 to B13 changes in accordance with instructions given from a user.

For instance, in FIG. 3, at an initial stage that the commercial products Q is designated, the product image IMA alone is displayed but the comparison article image IMB is not displayed in the observation window WN1. At this stage, only the buttons B01 to B03, the buttons B07 to B09, the buttons B10 to B11 and a return button are displayed as buttons.

As the article for comparison R is designated and the comparison article image IMB is displayed, the buttons B04 to B06 are displayed instead of the buttons B07 to B09. As the button B06 is clicked, the buttons B07 to B09 are displayed again instead of the buttons B04 to B06. As the button B05 is clicked, the button B13 is newly displayed. When the button B01 and the button B04 are clicked together, the button B14 and the button B15 are newly displayed.

Now, an observation image IM including the product image IMA and the comparison article image IMB is displayed in the observation window WN1. Further, the product information DTQ corresponding to this the commercial products Q is displayed. In FIG. 3, a price and a product name are displayed as the product information DTQ. When the commercial products Q or the article for comparison R is not designated, however, the observation image IM is not displayed. The observation image IM is displayed when the respective processing which will be described later is performed.

Referring back to FIG. 2 once again, the image designation part 122 executes processing for designation or modification regarding displaying of the observation image IM, such as designation of the commercial product Q which a user wishes to watch and the article for comparison R which is to be compared with the commercial product Q, designation of a rotation axis and an angle of rotation for rotating the commercial product Q or the article for comparison R, and designation or modification of a displaying magnification for the observation image IM.

These are designated in the following manner, as a user manipulates the keyboard 12c or the mouse 12d while looking at the views or windows in FIGS. 3 through 11 displayed on a display screen of the display apparatus 12b and causes the CPU to perform comparison, calculation, etc.

As shown in FIG. 4, in the catalogue view HG2, based on the simple image data KGA and the product information DTQ, simple images GA of the commercial products Q and information, such as the product names and prices, regarding the commercial products Q are displayed for the respective commercial products Q. Further, as shown in FIG. 5, in the article for comparison list view HG3, simple images GB of a plurality of articles for comparison R are displayed based on the simple image data KGB.

[Designation of Commercial Product]

The commercial product Q displayed in the commercial product view HG1 in FIG. 3 is designated in the catalogue view HG2 which is shown in FIG. 4. That is, as the button B03 is clicked in the commercial product view HG1, the catalogue view HG2 is displayed. As one simple image GA is selected from the simple images GA and clicked in the catalogue view HG2, this simple image GA is recognized and the corresponding commercial product Q is designated. Following this, the commercial product view HG1 is displayed together with the designated commercial product Q.

It is possible to display one or more than one commercial products Q in the commercial product view HG1 which is shown in FIG. 3. Various methods are available for selection of the number of the commercial products Q displayed in the commercial product view HG1. For instance, in the catalogue view HG2 which is shown in FIG. 4, the simple images GA corresponding to the commercial products Q to be displayed are clicked and accordingly highlighted, and an OK button is clicked in this condition. As a result, the commercial products Q represented by the highlighted simple images GA are selected. On the contrary, when one of the commercial products Q displayed in the commercial product view HG1 is not to be displayed, the simple image GA which is not to be displayed is clicked in the catalogue view HG2 so that the highlighting is eliminated, and the OK button is clicked in this condition.

[Designation of Article for Comparison]

The article for comparison R displayed in the commercial product view HG1 in FIG. 3 is designated in the article for comparison list view HG3 which is shown in FIG. 5. In other words, as the button B08 is clicked in the commercial product view HG1, the article for comparison list view HG3 appears. In the article for comparison list view HG3, one simple image GB is selected and the corresponding article for comparison R is designated.

Based on the size of the designated article for comparison R and the size of and the displaying magnification for the product image IMA which is already displayed, a displaying magnification for the article for comparison R is calculated. The article for comparison R is displayed at a predetermined position within the observation window WN1 based on the calculated displaying magnification.

The article for comparison R may be automatically designated by calculation. That is, the already selected commercial product Q is compared through calculation with each article for comparison R stored in the data storage part 112 of the server main unit 11a, and the article for comparison R is designated based on a result of the calculation. For instance, the article for comparison R is identified in the following sequence.

The articles for comparison R which are of the same type or close in type to the already selected commercial product Q or which are used together with the commercial product Q are extracted. When the type of the commercial product Q is "furniture" for example, "tableware" to be placed around the furniture is extracted as the articles for comparison R. From the extracted articles for comparison R, one article for comparison R corresponding to the size of the commercial product Q is calculated. For instance, setup is made in advance so as to calculate the articles for comparison R whose size is at a predetermined proportion to the commercial product Q. The articles for comparisons R which are relatively large are consequently designated for the large commercial products Q but the articles for comparisons R which are relatively small are consequently designated for the small commercial products Q.

The processing of automatically designating the articles for comparison R is started as the button B07 is clicked in the commercial product view HG1.

Alternatively, instead of designating from the articles for comparison R which are stored in the server 11, a method that users generate the articles for comparison R is used. As shown in FIG. 6 for example, a rectangular article for comparison RX is generated. As the article for comparison RX specified by designating the lengths Rs, Rt and Ru of the respective sides of the article for comparison RX, an article for comparison R is generated. In short, a user inputs the lengths of the respective sides of the article for comparison RX respectively in text boxes TB11, TB12 and TB13 in the size designation view HG4 which is shown in FIG. 6, and accordingly generates the article for comparison R. Based on the size of thus generated article for comparison R and the size of and the displaying magnification for the product image IMA which is already displayed, a displaying magnification for the article for comparison R is calculated. The size designation view HG4 is displayed as the button B09 is clicked in the commercial product view HG1 which is shown in FIG. 3.

[Rotation of Commercial Product and Article for Comparison]

Next, rotation of the commercial products Q and the articles for comparison R will be described.

First, when the commercial product Q is to be rotated, the button B01 shown in FIG. 3 is clicked. As a result, the button B01 is highlighted. With a mouse pointer placed on a part of the commercial product Q, the mouse is moved while pressing mouse button (dragging). Data corresponding to the direction of dragging and the amount of the movement are accordingly supplied to the image designation part 122. As a result, the commercial product Q alone is rotated in accordance with the direction in which the mouse is moved and the amount of the movement.

Next, when the article for comparison R is to be rotated, the button B04 is clicked. The button B04 is accordingly highlighted. In a manner similar to the above, the article for comparison R is dragged. As a result, the article for comparison R alone is rotated in accordance with the direction in which the mouse is moved and the amount of the movement.

When both the commercial product Q and the article for comparison R are to be rotated, after clicking both the button B01 and the button B04, a rotation mode is selected. The button B01 and the button B04 are highlighted as both the button B01 and the button B04 are clicked, and the buttons B14 and B15 are newly displayed for selection of a rotation mode.

Among rotation modes are an auto-rotation mode for rotating (auto-rotation) the commercial product Q and the article for comparison R individually and an orbital rotation mode for rotating the entirety while maintaining the relative positions of the two. The auto-rotation mode is invoked when the button B14 is clicked, while the orbital rotation mode is invoked when the button B05 is clicked.

In the auto-rotation mode, as the commercial product Q or the article for comparison R is dragged, as shown in FIG. 7(a), the commercial product Q and the article for comparison R are caused to rotate at the respective positions in the same direction at the same angle in accordance with the direction in which the mouse is moved and the amount of the movement.

In the orbital rotation mode, as the commercial product Q or the article for comparison R is dragged, as shown in FIG. 7(b), the commercial product Q and the article for comparison R rotate as a whole while maintaining their relative positions to each other. At this stage, without an orbital rotation axis designated, the two rotate about the central axis of the commercial product Q. In other words, the commercial product Q rotates about its central axis on its own and the article for comparison R rotates around the commercial product Q.

Conventional methods may be used as an algorithm for generating an image of a three-dimensional article which is rotated by dragging the mouse.

Referring back to FIG. 2 once again, the rotation calculation part 123 calculates a rotation axis and an angle of rotation for rotating the commercial product Q or the article for comparison R, based on designation supplied from the image designation part 122. The observation image generating part 124 generates the observation image IM for two-dimensional displaying, based on an output from the rotation calculation part 123.

In other words, based on the three-dimensional data DTA, DTB, the observation image generating part 124 generates a two-dimensional image rotated at an angle of rotation about a rotation axis designated by the rotation calculation part 123. Such processing of rotating images is processing of changing the relative positional relationship between the three-dimensional data DTA and the position of a view point, and is an approach which is used generally in the field of CG (computer graphics).

That is, as shown in FIG. 8, coordinate axes X, Y and Z for the three-dimensional data DTA regarding a commercial product, for instance, are decided to be rotation reference axes. The commercial product image of a commercial product is an image which is viewed from a view position regarding which the three-dimensional data DTA were designated. This view position is considered LA. When the commercial product image is to be rotated, assuming that the view position is to be rotated from LA to LB using the axis Z as a rotation axis, an image as it is at the post-rotation view position LB is calculated and displayed. In a similar manner, the image may be rotated using the axis X or Y as a rotation axis. Thus, a user can observe the commercial product Q from any desired direction while rotating the commercial product Q in any direction at any angle. This similarly applies to where the article for comparison R is to be rotated.

In the example described above, the direction in which an image is rotated and the angle at which the image is rotated are determined from the direction in which the mouse is dragged and the amount of the movement. As a different method, the direction in which an image is rotated, the angle at which the image is rotated and the like may be designated in the angle designation view HG5 as that shown in FIG. 9.

That is, angles of rotation about the axes X, Y and Z are entered for designation in text boxes TB21, TB22 and TB23 which are displayed within the angle designation view HG5. When the positions of the axes X, Y and Z are to be changed, each axis may be dragged with the mouse.

When the commercial product Q is to be rotated for instance, the button B01 shown in FIG. 3 is clicked and the angle designation view HG5 is retrieved. When the article for comparison R is to be rotated, the button B04 is clicked and the angle designation view HG5 is retrieved. When both the commercial product Q and the article for comparison R are to be rotated, the button B01 and the button B04 are clicked and the angle designation view HG5 is retrieved.

When both the commercial product Q and the article for comparison R are to be rotated, instead of clicking the button B01 and the button B04, a dedicated button for designating rotation of the entirety may be disposed.

[Modification of Displaying Magnification]

A displaying magnification for the observation image IM is designated or changed by means of the buttons B10 and B11 shown in FIG. 3. The displaying magnification increases by a predetermined value every time the button B10 is clicked but decreases by a predetermined value every time the button B12 is clicked. For example, every time the button B11 or B12 is clicked, the displaying magnification increases or decreases 5%.

Although as the displaying magnification increases, both the commercial product Q and the article for comparison R are displayed become accordingly larger, comparison with the commercial product Q becomes difficult if the article for comparison R becomes too large. In this case, the article for comparison R as it is currently displayed is replaced with the smaller article for comparison R, and a new observation image IM is generated and displayed.

In a similar manner, when the article for comparison R becomes too small in accordance with a decrease in displaying magnification, the article for comparison R as it is currently displayed is replaced with the larger article for comparison R, and a new observation image IM is generated and displayed.

In short, when the display size of the comparison article image IMB becomes larger than a predetermined size, the comparison article image IMB is changed to the comparison article image which is one size smaller. On the contrary, when the display size of the comparison article image IMB becomes smaller than a predetermined size, the comparison article image IMB is changed to the comparison article image which is one size larger.

For example, when the comparison article image IMB becomes too small to easily observe in accordance with a decrease in displaying magnification as in an observation window WN1a shown in FIG. 10(a), the article for comparison R in an observation window WN1b shown in FIG. 10(b) is replaced with something larger than the article for comparison R which is in the observation window WN1a, such as "human being."

Referring back to FIG. 2 once again, the observation image generating part 124 generates the observation image IM for two-dimensional displaying, based on the three-dimensional data DTA, DTB.

The displaying part 125 performs processing related to displaying of data on the display screen of the display apparatus 12b, such as displaying of the observation image IM generated by the observation image generating part 124.

Based on the position and the displaying magnification designated by the image designation part 122, the position/size calculation part 126 calculates the positions and the sizes of the commercial product Q and the article for comparison R so that the product image IMA and the comparison article image IMB will be displayed in the commercial product view HG1.

When the commercial product Q and the article for comparison R are designated at the first stage by the image designation part 122, the position/size calculation part 126 places the commercial product Q and the article for comparison R at appropriate positions. For instance, the commercial product Q is located toward the left-hand side in the observation window WN1 and the article for comparison R is located toward the right-hand side in the observation window WN1. In such a manner that the commercial product Q and the article for comparison R will not overlap with each other and that the observation image IM will not deviate from the observation window WN1, the positions of the commercial product Q and the article for comparison R and the size of the observation image IM are determined. An initial displaying magnification, for example, is accordingly calculated.

Following this, every time the image designation part 122 designates or changes the displaying magnification for the observation image IM, the size of the observation image IM is calculated. In a similar manner, every time the positions of the commercial product Q and the article for comparison R are changed, the positions of the commercial product Q and the article for comparison R are calculated.

The positions of the commercial product Q and the article for comparison R are changed, as a user manipulates the product image IMA of the observation image IM or the comparison article image IMB displayed the observation window WN1 using the mouse 12d as shown in FIG. 11.

Thus, the position/size calculation part 126 has a function of updating the positional information and the displaying magnification information in accordance with an instruction from a user.

[Modification of Article for Comparison]

A change in position of the article for comparison R will now be described.

The observation image IM shown in FIG. 11 is an image which is generated based on the three-dimensional data DTA regarding the commercial product Q and the three-dimensional data DTB regarding the article for comparison R as they are at a certain time point.

In FIG. 11, the article for comparison R before changing the position is located at a position P1a which is within a virtual space S. A Y-Z plane L is a plane which penetrates the position P1a and is parallel to the axes Y and Z.

The position of the article for comparison R is changed through two steps of changing on the Y-Z plane L and changing in the direction of the axis X.

The position after changing on the Y-Z plane L is calculated based on the direction and the amount of movement, of the comparison article image IMB using the mouse 12d. For instance, when the mouse 12d is moved in the left-right direction or the up-down direction, the position is changed in the direction of the axis Y or Z of the virtual space S in proportion to the amount of the movement.

In a similar manner, the position after changing the direction of the axis X is calculated based on the amount of movement, of the article for comparison R using the mouse 12d in the direction of the axis X. For instance, when the mouse 12d is moved in the up-down direction, the position of the article for comparison R is changed in the direction of the axis X in proportion to the amount of the movement.

For example, the comparison article image IMB is moved from the position P1a to a position P1b on the Y-Z plane L and further moved from the position P1b to a position P1c in the direction of the axis X, and the position of the article for comparison R is changed. At this stage, the size of the comparison article image IMB is changed to a size which corresponds to the position of the article for comparison R.

The comparison article image IMB is then calculated so that the observation image IM will be displayed in accordance with the changed position. Similar processing is executed on a change to the position of the commercial product Q.

However, since it is not possible to change the position in the Y-Z axis direction and in the direction of the axis X at the same time, processing or operations will be executed step by step as described below.

As the button B05 shown in FIG. 3 is clicked, manipulation of the mouse 12d is recognized as a change to the position of the article for comparison R on the Y-Z plane L, and the processing described above is executed on the comparison article image IMB. Further, the button B13 is newly displayed as the button B05 is clicked, and the button B13 is clicked so as to change the position in the direction of the axis X (the depth direction). For instance, the comparison article image IMB is moved backward on the screen as the mouse pointer moves to above on the screen, whereas the comparison article image IMB is moved forward on the screen as the mouse pointer moves to below on the screen. The displaying magnification for the comparison article image IMB is changed smaller when the comparison article image IMB is moved backward but changed larger when the comparison article image IMB is moved forward.

Further, when the button B02 is clicked, processing similar to the above is performed on the commercial product Q.

[Ordering Processing]

The ordering part 113 and the ordering part 127 execute processing regarding ordering of the commercial product Q.

Figure 12:
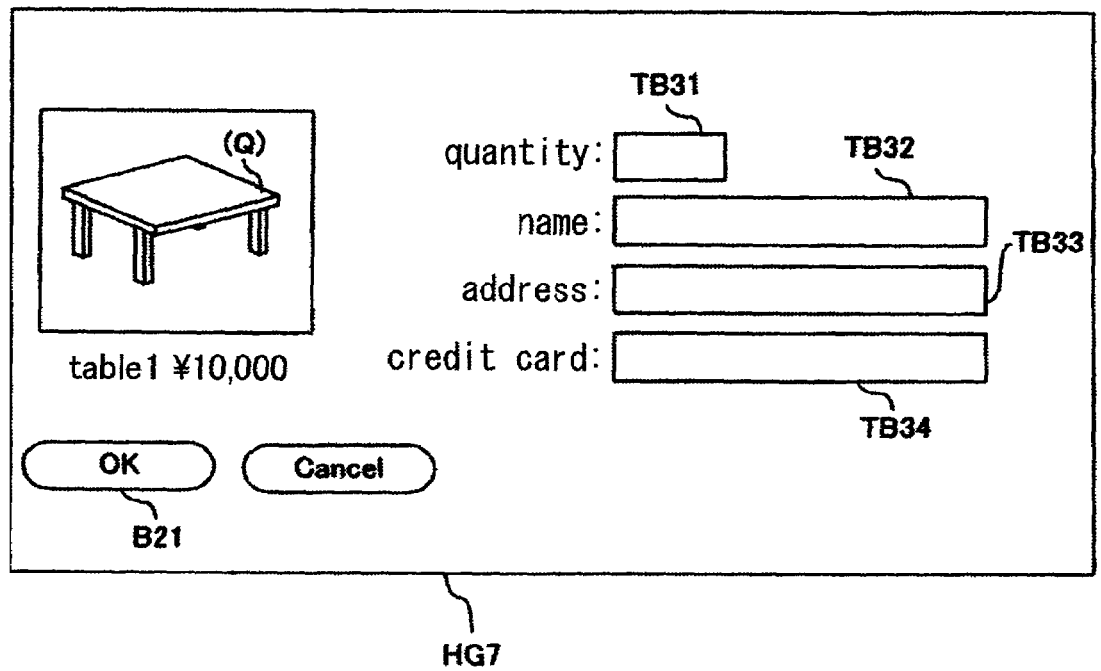
FIG. 12 is a drawing showing an example of an ordering view.

FIG. 12 is a drawing showing an example of the ordering view HG7.

The ordering part 127 places an order for the commercial product Q to the server 11, based on information entered through the ordering view HG7 which is shown in FIG. 12. The ordering part 113 takes the order for the commercial product Q from the ordering part 127, and executes processing regarding ordering.

In FIG. 12, in text boxes TB31 to TB34, the quantity of the ordered commercial product Q, the name of a purchaser, the address to which the commercial product Q should be delivered and the credit card number of a credit card used for payment are entered. As the button B21 is clicked after making these entries, the information entered in the text boxes TB31 to TB34 is sent to the server 11.

[Description with Flow Chart]

A description will be now made to the flow of processing in which the terminal apparatus 12 accesses the server 11, a catalogue is downloaded and an order for the commercial product Q is made, with reference to a flow chart.

Figure 13:
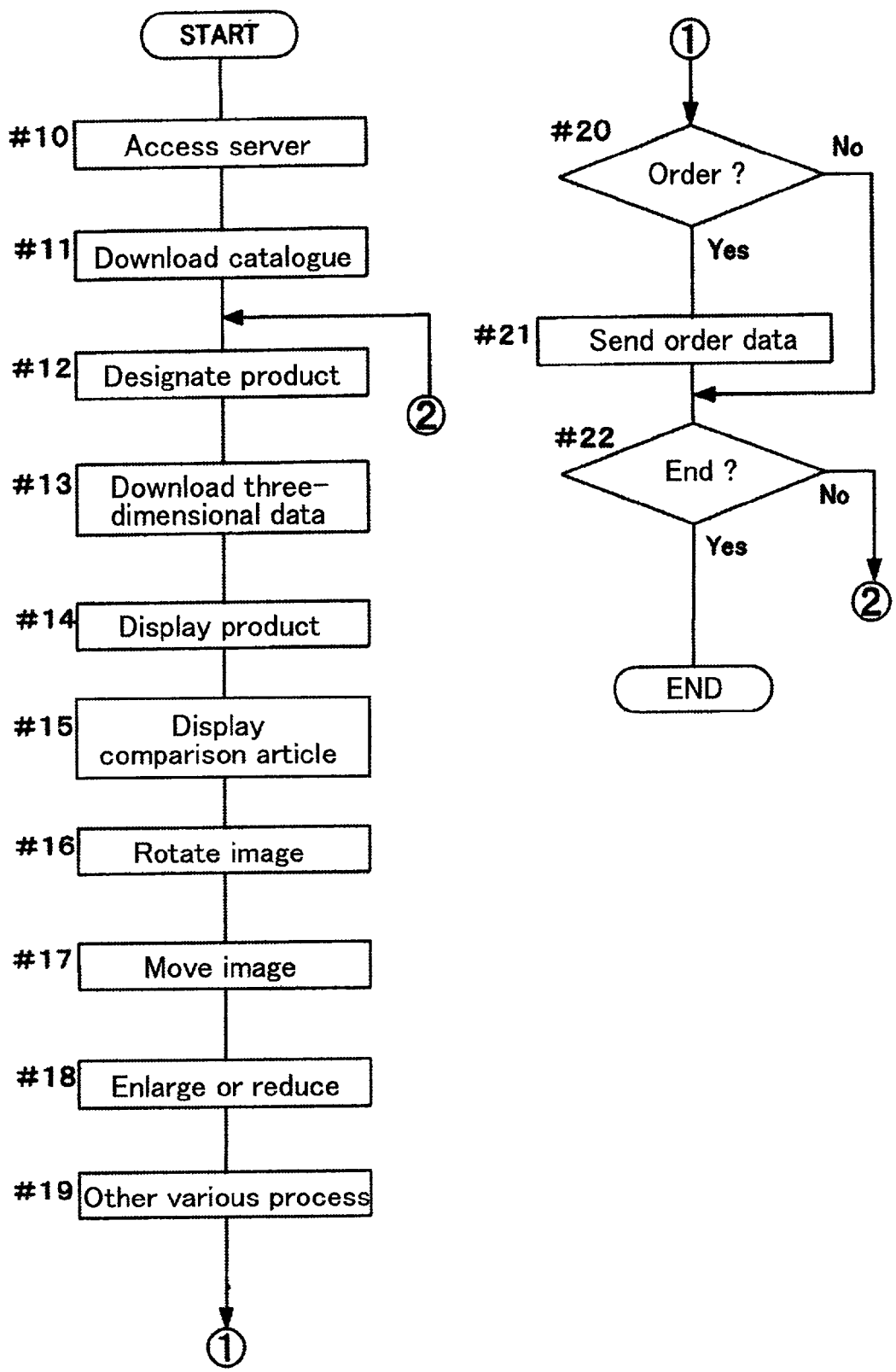
FIG. 13 is a flow chart for describing the outline of the flow of overall processing in a terminal apparatus.

FIG. 13 is a flow chart for describing the outline of the flow of overall processing in the terminal apparatus 12.

As shown in FIG. 13, manipulating the terminal apparatus 12, a user accesses the server 11 on the Internet (#10). Catalogue information is downloaded from the server 11 (#11). In response, the terminal apparatus 12 displays the catalogue view HG2 as that shown in FIG. 4. The user designates the desired commercial product Q in the view (#12). This makes the three-dimensional data DTA regarding the commercial product Q downloaded from the server 11 (#13). At this stage, processing programs for the various image processing described above are downloaded together. As the downloaded processing program is started, processing of displaying the commercial product is performed and the commercial product view HG1 is displayed on the display screen of the terminal apparatus 12 based on the three-dimensional data DTA (#14). It is also possible to select or change the commercial product at the step #14.

Following this, in response to manipulations a user makes, an article for comparison is selected or changed and displayed (#15), the image is rotated (#16), the image is moved (#17), the image is enlarged or reduced (#18) and other various processing is executed (#19). When there is the commercial product Q the user likes, the user places an order for the commercial product Q (#20). As a result, order data are sent from the terminal apparatus 12 to the server 11 (#21). The processing at the steps #15 to #20 is executed as the corresponding buttons in the commercial product view HG1 are clicked and corresponding routines are retrieved.

The server 11 receives the order data from the terminal apparatus 12 and stores the data in an appropriate memory area. A person in charge arranges and dispatches the commercial product to the user based on the order.

Although the processing programs at the later steps after the step #14 executed by the terminal apparatus 12 are downloaded from the server 11 in the preferred embodiment above, these processing programs maybe supplied in the form of recording mediums ST1, 2 such as a CD-ROM and a magnetic optical disk (FIG. 1). In this case, the processing programs stored in the recording mediums are pre-installed in the terminal apparatus 12. The functions at the steps #10 to #13 are provided by means of WWW browser which the terminal apparatus 12 usually has. However, processing programs for these functions as well may be supplied as the recording mediums above such as a CD-ROM.

In addition, while the catalogue information, the three-dimensional data DTA, DTB and the like are downloaded from the server 11, these may be read from recording mediums such as a CD-ROM.

Further, the three-dimensional data DTA, DTB may be processed in the server 11, without downloading the three-dimensional data DTA, DTB to the terminal apparatus 12 or supplying the three-dimensional data DTA, DTB from recording mediums. In short, in this case, manipulating the terminal apparatus 12, a user provides an instruction, such as selection, position, rotation, enlarging and reduction, regarding the commercial product Q and the article for comparison R and sends the instruction to the server 11. Based on the instruction, the server 11 processes the three-dimensional data DTA, DTB and sends the processed image data to the terminal apparatus 12. It is necessary that the server 11 executes a processing program for such processing.

Hence, in this case, the user's instruction is sent from the terminal apparatus 12 to the server 11, and the image data such as the product image IMA and the comparison article image IMB are sent from the server 11 to the terminal apparatus 12. The terminal apparatus 12 displays the commercial product view HG1 based on the received image data. This will be described later in more details in relation to a second preferred embodiment.

Now, an example of processing or partial processing at the steps #14 to #17 above will now be described.

Figure 14:
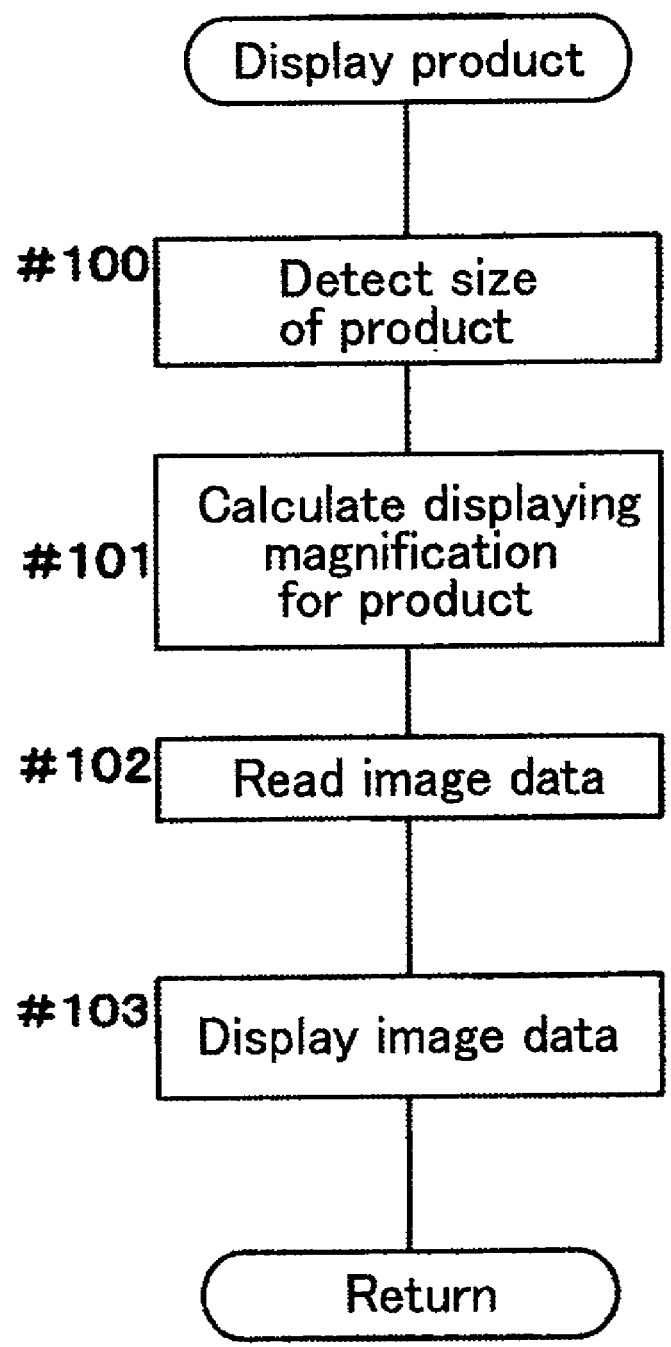
FIG. 14 is a flow chart showing an example of processing of displaying a commercial product.

FIG. 14 is a flow chart showing an example of processing of displaying the commercial products.

In FIG. 14, the size of the image data on the selected commercial product Q is detected from the product information DTQ which is stored in the data storage part 112 (#100). The image size of the selected commercial product Q is compared with the pixel number in a display area (observation window WN1), a display size of and a displaying magnification for the product image IMA are then calculated (#101). Image data for two-dimensional displaying are generated based on the three-dimensional data DTA and read (#102), and displayed in the observation window WN1 (#103). As a result, the product image IMA are displayed in the display screen at an appropriate displaying magnification.

Figure 15:
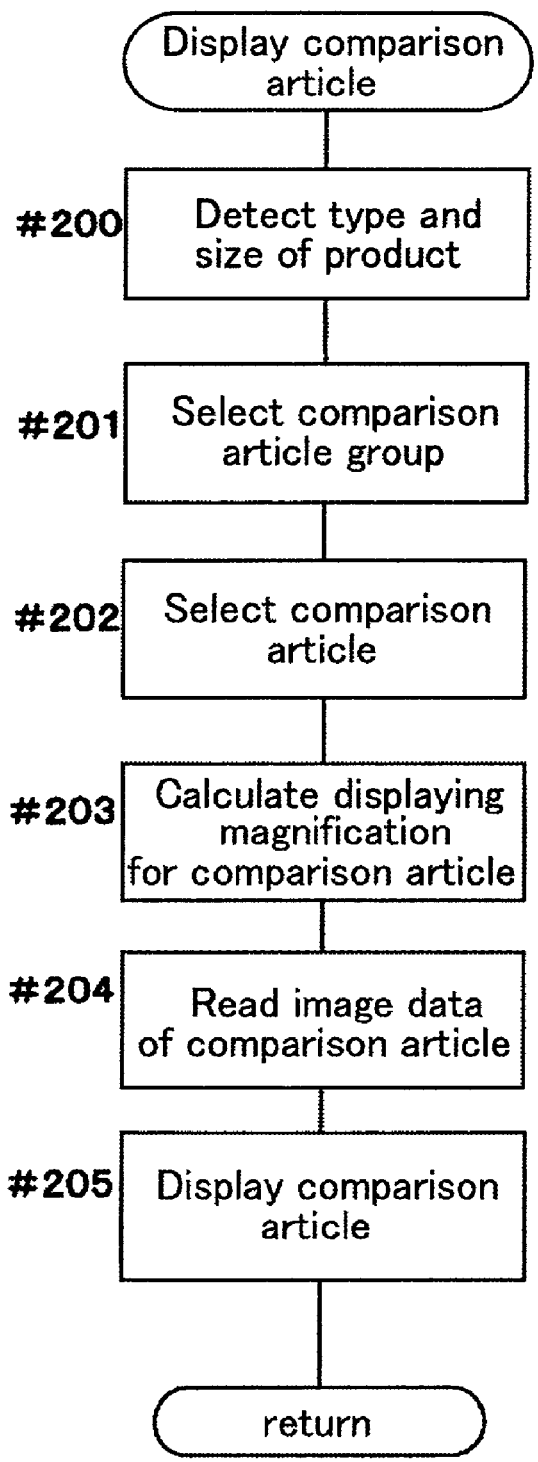
FIG. 15 is a flow chart showing an example of processing of automatic selection of an article for comparison.

FIG. 15 is a flow chart showing an example of processing of automatic selection of articles for comparison. This flow chart is executed when the button B07 is clicked in the commercial product view HG1 which is shown in FIG. 3.

First, the types (product classes) and the sizes of the commercial products displayed at this stage are detected based on the product information DTQ (#200). A comparison article group corresponding to the types of the displayed commercial products is selected (#201). For instance, when the type of the commercial product Q is "furniture" for example, "tableware, " "human being" or the like to be placed around the furniture is extracted as the articles for comparison R, and when the type of the commercial product Q is "electric appliance," "CD" or the like is extracted as the articles for comparison R.

One article for comparison R corresponding to the size of the commercial product Q is selected from the articles for comparison R which are included in the selected comparison article group (#202). Relatively large articles for comparison R are associated with large commercial products Q.

A displaying magnification for the comparison article image IMB is calculated from the size of and a displaying magnification for the displayed product image IMA and the sizes of the displayed articles for comparison R (#203). The comparison article image IMB is displayed at a predetermined position within the observation window WN1 based on the calculated displaying magnification (#204, #205).

Figure 16:
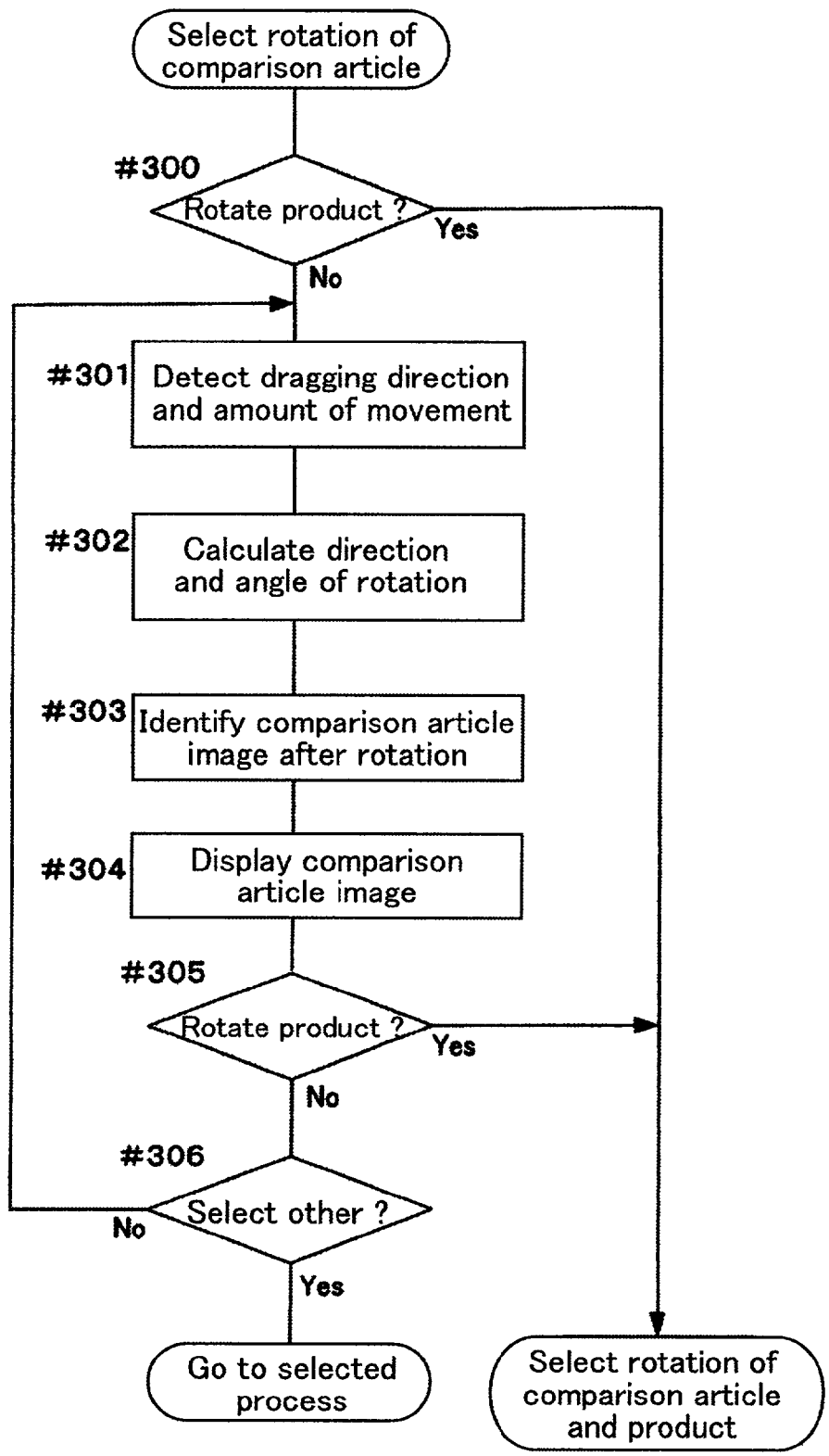
FIG. 16 is a flow chart showing an example of processing of rotating an article for comparison.

FIG. 16 is a flow chart showing an example of processing of rotating an article for comparison during image rotation. This flow chart is executed when the button B04 is clicked in the commercial product view HG1 which is shown in FIG. 3.

Whether rotation of the product image IMA is selected is judged (#300). When YES, the sequence proceeds to a flow chart (FIG. 17) which requires the product image IMA and the comparison article image IMB to rotate together.

When the product image IMA is not selected, it is determined that rotation of only the comparison article image IMB is instructed. As the comparison article image IMB is dragged within the observation window WN1, the dragging direction and the amount of the movement are detected (#301).

From the detected direction and amount of the movement, the direction in which the image is rotated and the angle of rotation are calculated (#302). The comparison article image IMB as it is after rotation is identified based on the direction and the angle of rotation, and displayed (#303, #304).

When neither rotation of the commercial product Q nor other buttons is selected (NO at #305, #306), rotation of the comparison article image IMB is continued. As other button is selected (YES at #306), the sequence proceeds to the selected processing.

Figure 17:
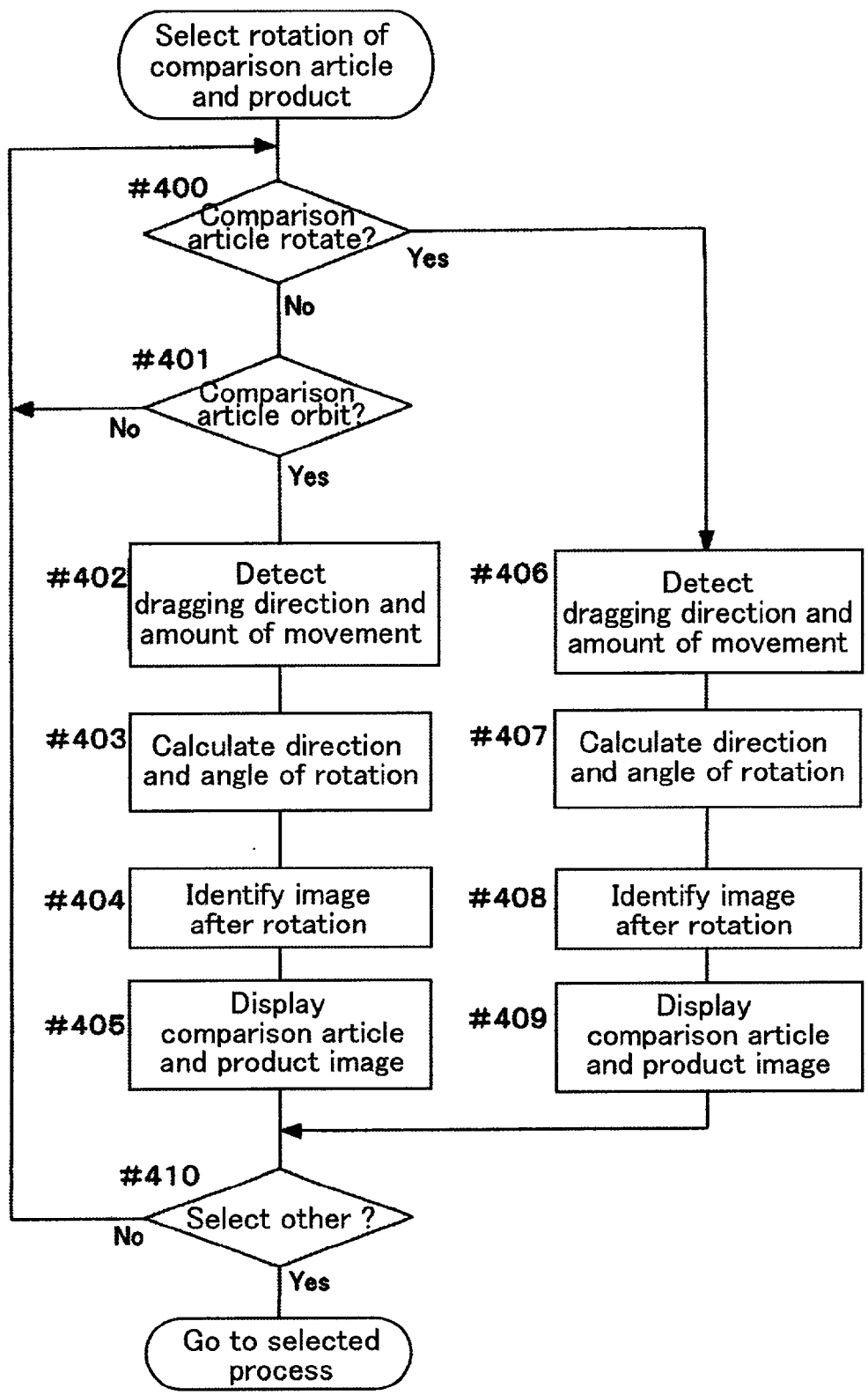
FIG. 17 is a flow chart showing an example of processing of rotating an article for comparison and a commercial product.

FIG. 17 is a flow chart showing an example of processing of rotating an article for comparison and a commercial product during image rotation. This flow chart is executed when both the button B01 and the button B04 are clicked in the commercial product view HG1 which is shown in FIG. 3.

When the button B14 for auto-rotation is clicked (YES at #400), the steps #406 to #409 for auto-rotation are executed. When the button B15 for orbital rotation is clicked (YES at #401), the steps #402 to #405 for orbital rotation are carried out. The contents of the processing at these the steps #402 to #405 and the steps #406 to #409 are similar to those at the steps #301 to #304 above except for that rotation is auto-rotation or orbital rotation.

Figure 18:
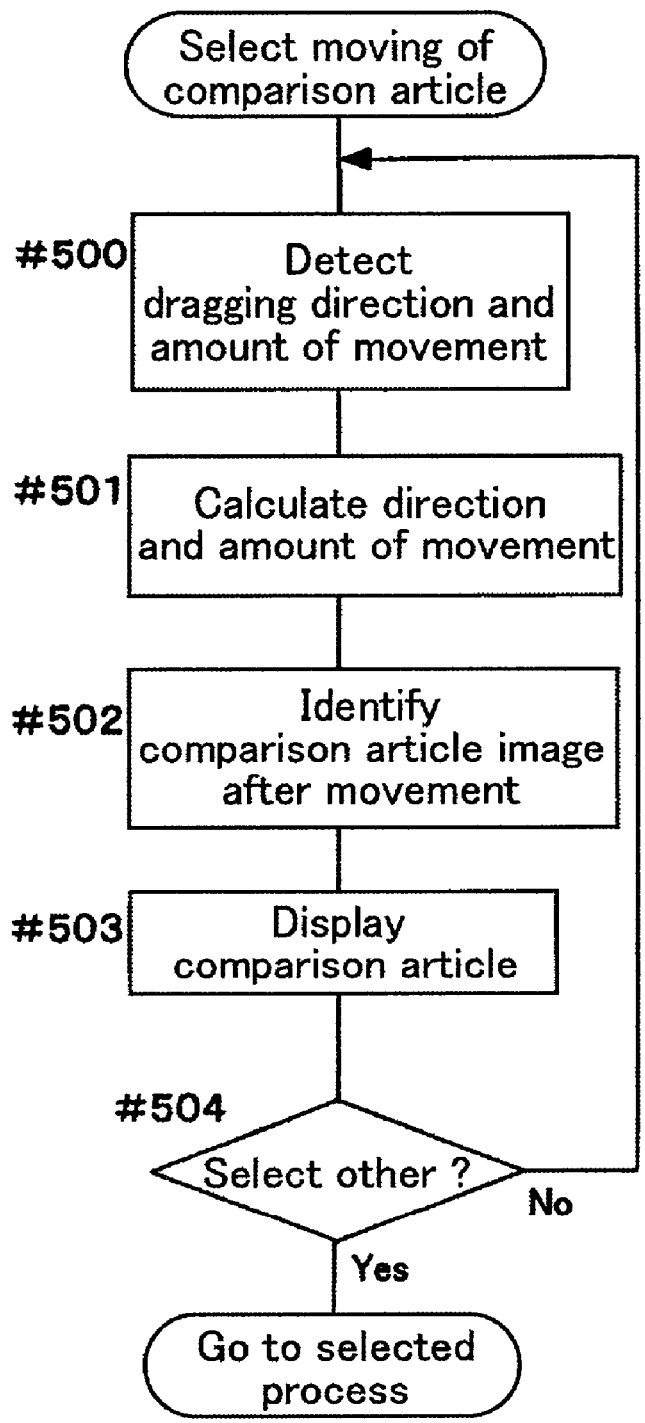
FIG. 18 is a flow chart showing an example of processing of moving an article for comparison.

FIG. 18 is a flow chart showing an example of processing of moving an article for comparison during image movement. This flow chart is executed when the button B05 is clicked in the commercial product view HG1 which is shown in FIG. 3.

As a user drags the comparison article image IMB within the observation window WN1, the dragging direction and the amount of the movement are detected (#500).

From the detected direction and amount of the movement, the direction in which the image is moved and the angle of movement are calculated (#501). The comparison article image IMB as it is after movement is identified based on the direction and the angle of movement, and displayed (#502, #503).

Unless other button is selected, the comparison article image IMB is continuously moved. When other button is selected (YES at #504), the sequence proceeds to the selected processing.

In this preferred embodiment, since images are displayed so that the commercial product Q can be compared with the articles for comparison R in the observation window WN1, it is easier for a user to grasp the size of the commercial product with his or her sense. Further, since the three-dimensional data DTA are used to display the commercial product Q and the articles for comparison R, it is possible to display natural images, and with the displayed image rotated or otherwise processed, it is possible to observe the commercial product Q and the articles for comparison R from any direction.

Second Preferred Embodiment

Figure 19:
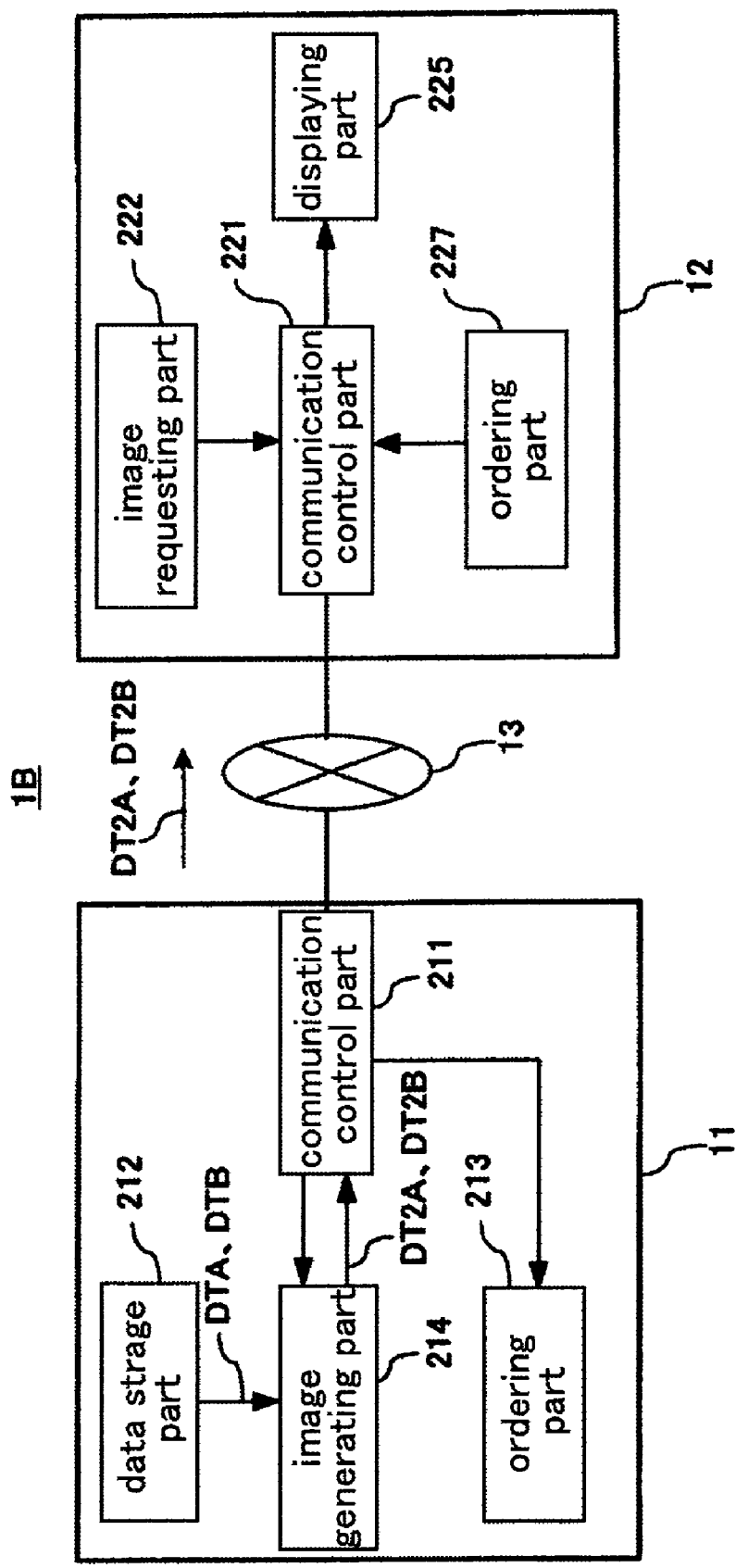
FIG. 19 is a drawing of the functional structure of an electronic catalogue system in a second preferred embodiment.
Figure 20:
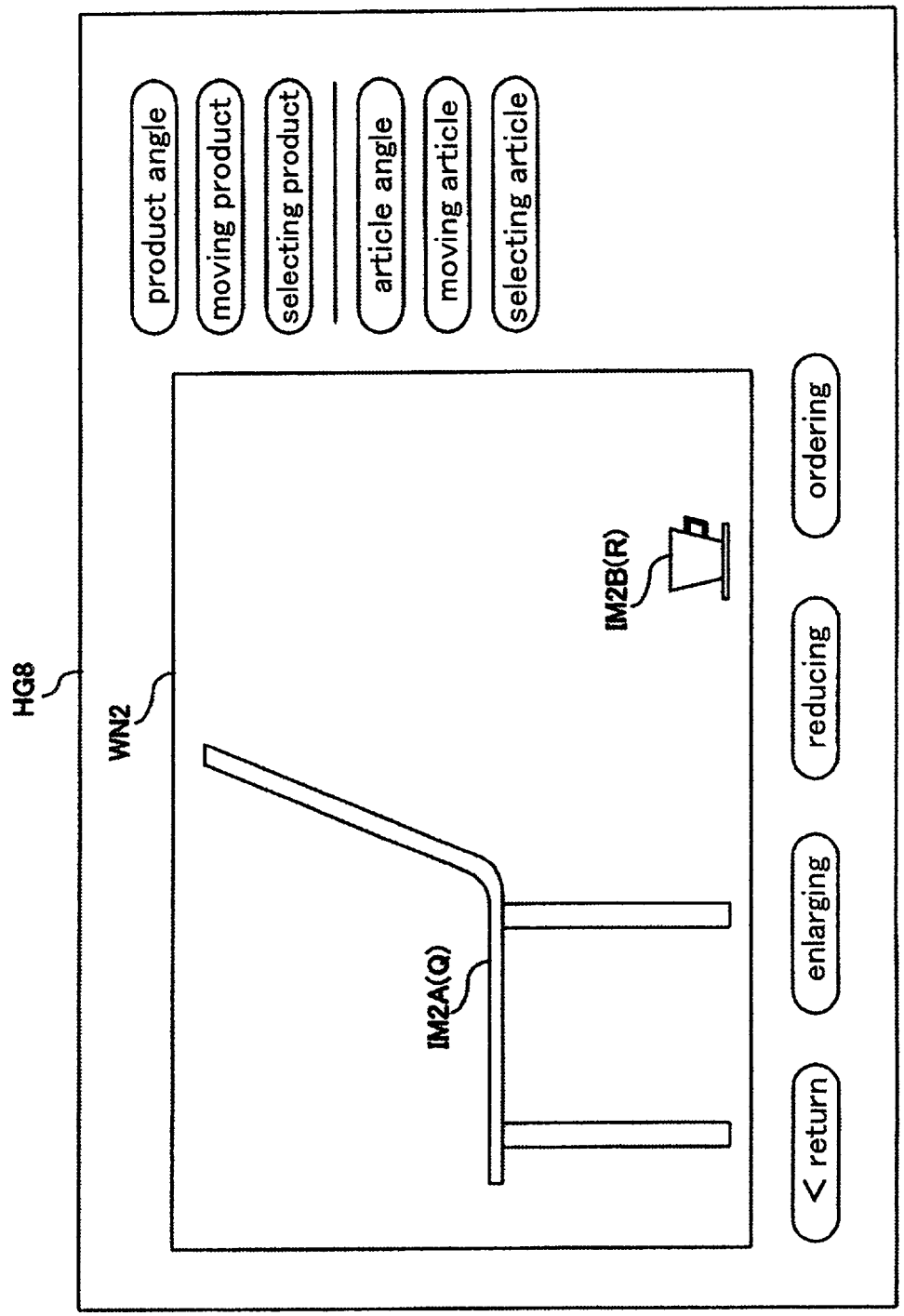
FIG. 20 is a drawing showing an example of a commercial product view.

FIG. 19 is a drawing of the functional structure of an electronic catalogue system 1B in a second preferred embodiment, and FIG. 20 is a drawing showing an example of the commercial product view HG8.

In the electronic catalogue system 1 according to the first preferred embodiment, the terminal apparatus 12 generates the product image IMA and the comparison article image IMB based on the three-dimensional data DTA, DTB which are downloaded from the server 11.

In the electronic catalogue system 1B according to the second preferred embodiment, the terminal apparatus 12 receives the image data regarding the commercial product Q and the articles for comparison R generated by the server 11 and displays the images of the commercial product Q and the articles for comparison R based on the image data.

As the electronic catalogue system 1B shown in FIG. 1, the structure of the electronic catalogue system 1B is formed by the server 11 and the like. Having such a structure, the electronic catalogue system 1B realizes a functional structure as that shown in FIG. 14.

In the electronic catalogue system 1B shown in FIG. 14, the server 11 includes a communication control part 211, a data storage part 212, an ordering part 213, an image generating part 214. The terminal apparatus 12 includes a communication control part 221, an image requesting part 222, a displaying part 225, an ordering part 227.

The communication control parts 211, 221, the data storage part 212, the ordering part 213 and the ordering part 227 have similar functions to the communication control parts 111, 121, the data storage part 112, the ordering part 113 and the ordering part 127 according to the first preferred embodiment.

The image requesting part 222 designates the commercial product Q and the articles for comparison R to be displayed and the directions in which the commercial product Q and the articles for comparison R are to be observed.

In response to the designation given from the image requesting part 222, the image generating part 214 generates image data DT2A, DT2B based on the three-dimensional data DTA, DTB corresponding to the commercial product Q and the articles for comparison R.

For instance, when "table 1" and "cup" are designated in the catalogue view HG2 shown in FIG. 4 and the article for comparison list view HG3 shown in FIG. 5 and designation is made so as to observe these from the side, the image data DT2A, DT2B for displaying a product image IM2A and a comparison article image IM2B as those shown in FIG. 20 are generated.

The displaying part 225 downloads the generated image data DT2A, DT2B from the server 11, and the product image IM2A and the comparison article image IM2B are displayed in an observation window WN2 in the commercial product view HG8 shown in FIG. 20 based on the image data.

In the second preferred embodiment, since the observation image IM is generated by the server 11, a processing load upon the terminal apparatus 12 is lighter than in the first preferred embodiment. Further, since the image is generated while designating the direction in which the commercial product Q is observed, it is possible to observe the commercial product Q at various angles, and therefore, a user can easily grasp the size of the commercial product, with his or her sense.

Figure 21:
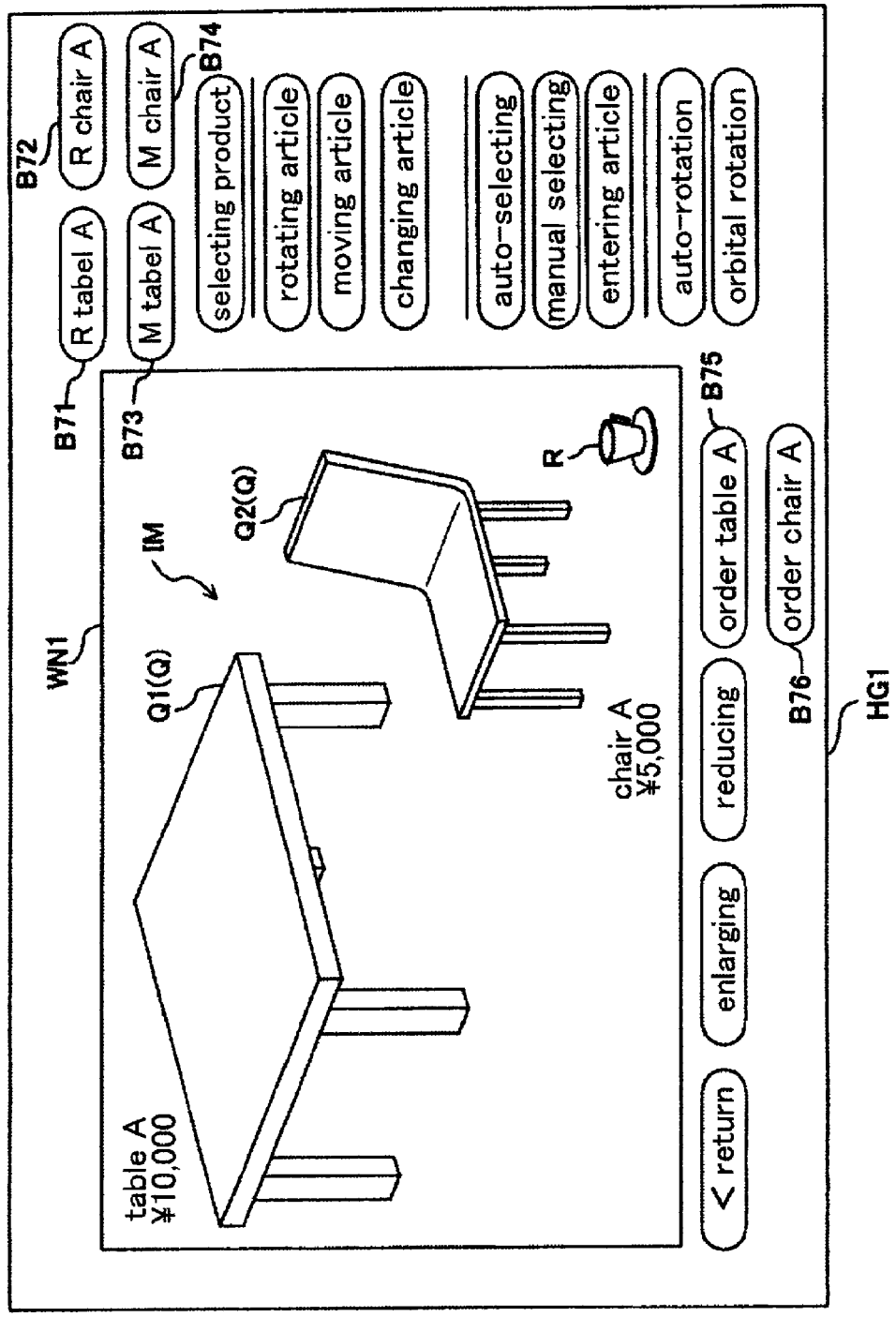
FIG. 21 is a drawing showing an example of a commercial product view which shows a plurality of commercial products.
Figure 22:
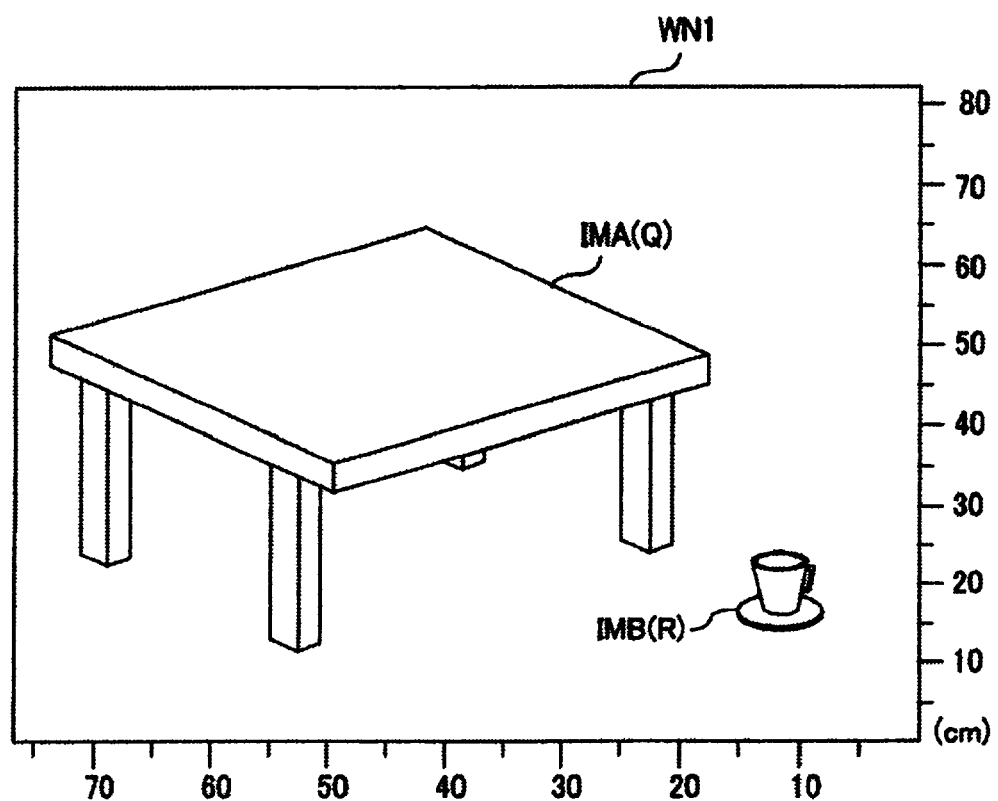
Figure 22:
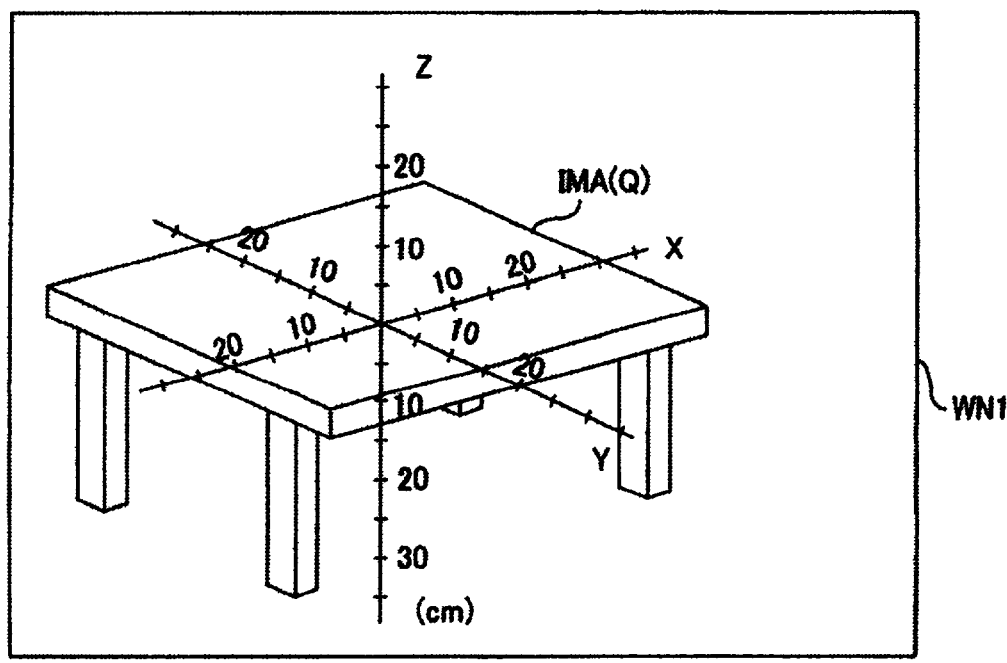

FIG. 21 is a drawing showing an example of the commercial product view HG1 which shows a plurality of commercial products Q, and FIG. 22 is a drawing showing an example of the observation window WN1 which shows a ruler and the like.

While only one commercial product Q is displayed in the commercial product view HG1 and the commercial product view HG8 in the second preferred embodiment, the plurality of commercial products Q may be displayed. For instance, as shown in FIG. 21, a table Q1 and a table Q2 may be displayed at the same time. In this case, the commercial product view HG1 includes buttons B71 to B74 for individually rotating or moving the table Q1 and the table Q2 and buttons B75 and B76 for ordering. The commercial product view HG8 as well similarly includes buttons for the respective commercial products Q which are displayed. Allowing to compare the sizes of the commercial products Q with each other, this example is convenient when one wishes to purchase the plurality of commercial products Q, e.g., a combination of a table and a chair, as a set. A program for causing the terminal apparatus 12 to achieve the processing of this example is approximately similar to the flow chart shown in FIG. 13.

As shown in FIG. 22, the commercial product view HG1 may include a ruler or graduated coordinate axis for showing the width, the height and the like of the commercial product Q or the article for comparison R. As shown in FIG. 22(a), rulers may be displayed at the top and on the right-hand side in the observation window WN1. Alternatively, as shown in FIG. 22(b), graduated coordinate axes may be displayed over the product image IMA.

The structures of, the contents of the processing in, the order of the processing in the entirety or the respective portions of the electronic catalogue systems 1, 1B, the server 11 or the terminal apparatus 12, the structures of the views such as the commercial product view HG1, the method of manipulating the mouse 12d and the like may be appropriately modified along the intention of the present invention.

As described above, according to the present invention, with a commercial product displayed together with an article for comparison on the display screen, it is possible to grasp the size of the commercial product with sense.

According to the inventions described in claims 1 through 9 in particular, since the three-dimensional data are used for generation of the images of a commercial product and an article for comparison, it is possible to display natural images.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An electronic catalogue system for displaying on one screen an image of a commercial product and an image of an article for comparison in order for a viewer of the one screen to acquire a visual recognition of the size of the commercial product as compared to the size of the article for comparison, comprising:

a server comprising
  a reader configured to read three-dimensional data of the commercial product and three-dimensional data of the article for comparison;
  an observation image generator configured to generate an observation image in which the image of the commercial product and the image of the article for comparison are located at predetermined positions based on the read three-dimensional data of the commercial product and three-dimensional data of the article for comparison; and
  a selecting device configured to automatically select the article for comparison in accordance with a type and a size of the commercial product;
a displaying device configured to display the generated observation images, the displaying device including the one screen on which the image of the commercial product and the image of the article for comparison are displayed under the same scale;
a terminal apparatus from which a positional relationship between the image of the commercial product and the image of the article of comparison on the screen can be changed by request of the terminal apparatus; and
a communication line connecting the server and the terminal apparatus.

2. The electronic catalogue system according to claim 1, further comprising:

designator for designating a rotation axis and an angle of rotation; and
rotating device for rotating the observation image based on the designated rotation axis and the designated angle of rotation.

3. The electronic catalogue system according to claim 1, further comprising:

designator for designating a rotation axis and an angle of rotation for each one of the commercial product and the article for comparison; and
rotating device for rotating the image of the commercial product or the image of the article for comparison based on the designated rotation axis and the designated angle of rotation.

4. The electronic catalogue system according to claim 1, further comprising:

article for comparison storing device for storing three-dimensional data of a plurality of articles for comparison; and
selector for selecting the three-dimensional data of one article for comparison from the article for comparison storing device,
wherein the reader reads the three-dimensional data of the selected article for comparison.

5. The electronic catalogue system according to claim 1, further comprising:

product storing device for storing a product information regarding features of the commercial product, said product information being associated with the three-dimensional data of the commercial product, wherein the displaying device displays the observation image together with the product information which corresponds to the image of the commercial product which is included in the observation image.

6. The electronic catalogue system according to claim 1, wherein a display magnification for the article for comparison is calculated based on the size of the article for comparison, and both the size and a display magnification of the displayed commercial product, and the article for comparison is displayed at a predetermined position within the observation image based on the calculated display magnification.

7. The catalogue system according to claim 1, wherein when a positional relationship between the image of the commercial product and the image of the article for comparison on the screen is changed, the size of the image of the article for comparison is changed to a size which corresponds to the position of the article for comparison.

8. The electronic catalogue system according to claim 7, wherein a size of the image of the article for comparison is changed to be smaller when the image of the article for comparison is moved backward, and a size of the image of the article for comparison is changed to be larger when the image of the article for comparison is moved forward.

9. A server computer used in an electronic catalogue system for displaying on one screen an image of a commercial product and an image of an article for comparison in order for a viewer of the one screen to acquire a visual recognition of the size of the commercial product as compared to the size of the article for comparison, the server computer comprising;

three-dimensional data storing device configured to store three-dimensional data of the commercial product and three-dimensional data of the article for comparison;

an observation image generator configured to generate an observation image including the image of the commercial product and the image of the article for comparison, the image of the commercial product and the image of the article for comparison being based on the three-dimensional data of the commercial product and the three-dimensional data of the article for comparison stored in the three-dimensional data storing device;

a sender configured to send the generated image of the commercial product and the generated image of the article for comparison; and a selecting device configured to automatically select the article for comparison in accordance with a type and a size of the commercial product;

wherein the image of the commercial product and the image of the article for comparison are displayed under a same scale on said one screen, and a positional relationship between the image of the commercial product and the image of the article for comparison on the screen can be changed by a request of a terminal apparatus.

10. The server according to claim 9, wherein a display magnification for the article for comparison is calculated based on the size of the article for comparison, and both the size and a display magnification of the displayed commercial product, and the article for comparison is displayed at a predetermined position within the observation image based on the calculated display magnification.

11. A computer program product for a terminal apparatus, used in an electronic catalogue system, for displaying on one screen an image of a commercial product and an image of an article for comparison in order for a viewer of the one screen to acquire a visual recognition of the size of the commercial product as compared to the size of the article for comparison, the computer program product comprising:

a computer readable storage medium having a computer program stored thereon for causing the terminal apparatus to execute the operations of:

reading three-dimensional data of the commercial product and three-dimensional data of the article for comparison, generating an observation image in which the commercial product and the article for comparison are located at predetermined positions based on the read three-dimensional data of the commercial product and three-dimensional data of the article for comparison, displaying the generated observation image on said one screen; and automatically selecting the article for comparison in accordance with a type and a size of the commercial product wherein the image of the commercial product and the image of the article for comparison are displayed under a same scale on said one screen, and a positional relationship between the image of the commercial product and the image of the article for comparison on the screen can be changed by a request of a terminal apparatus.

12. The computer program product according to claim 11, wherein a display magnification for the article for comparison is calculated based on the size of the article for comparison, and both the size and a display magnification of the displayed commercial product, and the article for comparison is displayed at a predetermined position within the observation image based on the calculated display magnification.

13. A computer program product for a terminal apparatus, used in an electronic catalogue system, for displaying an image of a commercial product on a screen and an image of an article for comparison in order for a viewer of the screen to acquire a visual recognition of the size of the commercial product as compared to the size of the article for comparison, the computer program product comprising:

a computer readable storage medium having a computer program stored thereon for causing the terminal apparatus to execute the operations of:

reading data for generating the image of the commercial product and data for generating the image of the article for comparison, generating an observation image in which the commercial product and the article for comparison are located at predetermined positions based on respective read data, automatically selecting the article for comparison in accordance with a type and a size of the commercial product, and changing a positional relationship between the commercial product and the article for comparison and updating the observation image;

wherein the image of the commercial product and the image of the article for comparison are displayed under a same scale on said screen, and a positional relationship between the image of the commercial product and the image of the article for comparison on the screen can be changed by a request of a terminal apparatus.

14. The computer program product according to claim 13, wherein the computer program further causes the terminal apparatus to execute the operation of automatically selecting the article for comparison in accordance with a type and a size of the commercial product.

15. The computer program product according to claim 13, wherein
a display magnification for the article for comparison is calculated based on the size of the article for comparison, and both the size and a display magnification of the displayed commercial product, and
the article for comparison is displayed at a predetermined position within the observation image based on the calculated display magnification.

16. A computer program product for a terminal apparatus, used in an electronic catalogue system, for displaying on a screen an image of a first commercial product, an image of a second commercial object and an image of an article for comparison in order for a viewer of the screen to acquire a visual recognition of the size of the first and second commercial products as compared to the size of the article for comparison, the computer program product comprising:
a computer readable storage medium having a computer program stored thereon for causing the terminal apparatus to execute the operations of:
reading data for generating the image of a first commercial product and a the image of a second commercial product;
generating an observation image in which the first and second commercial products and an article for comparison are located at predetermined positions based on respective read data; and
automatically selecting the article for comparison in accordance with a type and a size of the commercial product;
wherein the images of the first and second commercial products and the image of the article for comparison are displayed under a same scale on said screen, and a positional relationship between the image of the commercial product and the image of the article for comparison on the screen can be changed by a request of a terminal apparatus.

17. The computer program product according to claim 16, wherein
a display magnification for the article for comparison is calculated based on the size of the article for comparison, and both the size and a display magnification of the displayed first and second commercial products, and
the article for comparison is displayed at a predetermined position within the observation image based on the calculated display magnification.

18. An electronic catalogue system for displaying on one screen a image of a commercial product and an image of an article for comparison in order for a viewer of the one screen to acquire a visual recognition of the size of the commercial product as compared to the size of the article for comparison, comprising:
a server comprising
a reader configured to read three-dimensional data of the commercial product and three-dimensional data of the article for comparison;
an observation image generator configured to generate an observation image in which the image of the commercial product and the image of the article for comparison are located at predetermined positions based on the read three-dimensional data of the commercial product and three-dimensional data of the article for comparison; and
a selecting device configured to automatically select the article for comparison in accordance with a type and a size of the commercial product;
a displaying device configured to display the generated observation images, the displaying device including the one screen on which the image of the commercial product and the image of the article for comparison are displayed under the same scale;
a terminal apparatus from which a positional relationship between the image of the commercial product and the image of the article for comparison on the screen can be changed by request of the terminal apparatus; and
a communication line connecting the server and the terminal apparatus;
wherein the image of the commercial product and the image of the article for comparison do not overlap with each other in an observation window and the observation image does not deviate from the observation window.

19. An electronic catalogue system for displaying on one screen an image of a commercial product and an image of an article for comparison in order for a viewer of the one screen to acquire a visual recognition of the size of the commercial product as compared to the size of the article for comparison, comprising:
a server comprising
a reader configured to read for reading three-dimensional data of the commercial product and three-dimensional data of the article for comparison;
an observation image generator configured to generate an observation image in which the image of the commercial product and the image of the article for comparison are located at predetermined positions based on the read three-dimensional data of the commercial product and three-dimensional data of the article for comparison; and
a selecting device configured to automatically select the article for comparison in accordance with a type and a size of the commercial product; and
a displaying device configured to display the generated observation images, and displaying device including the one screen on which the image of the commercial product and the image of the article for comparison are displayed under the same scale.

20. The electronic catalogue system according to claim 19, wherein the article for comparison is selected after the commercial product is selected by a terminal apparatus.

21. The electronic catalogue system according to claim 19, wherein the article for comparison is replaced from the first chosen article for comparison for the specified commercial product.

* * * * *